US010464254B2

(12) United States Patent
Gelli

(10) Patent No.: US 10,464,254 B2
(45) Date of Patent: Nov. 5, 2019

(54) EMBOSSING ROLLER, EMBOSSING UNIT, EMBOSSING METHOD AND EMBOSSED PRODUCT

(75) Inventor: Mauro Gelli, Lucca (IT)

(73) Assignee: ENGRAVING SOLUTIONS S.R.L., Lucca (IT)

( * ) Notice: Subject to any disclaimer, the term of this patent is extended or adjusted under 35 U.S.C. 154(b) by 923 days.

(21) Appl. No.: 14/112,574

(22) PCT Filed: Apr. 13, 2012

(86) PCT No.: PCT/EP2012/056772
§ 371 (c)(1),
(2), (4) Date: Oct. 18, 2013

(87) PCT Pub. No.: WO2012/143295
PCT Pub. Date: Oct. 26, 2012

(65) Prior Publication Data
US 2014/0044923 A1 Feb. 13, 2014

(30) Foreign Application Priority Data

Apr. 19, 2011 (IT) ................ FI2011A0075

(51) Int. Cl.
B29C 59/04 (2006.01)
B31F 1/07 (2006.01)
A47K 10/16 (2006.01)
D21H 27/00 (2006.01)

(52) U.S. Cl.
CPC ............ B29C 59/04 (2013.01); A47K 10/16 (2013.01); B31F 1/07 (2013.01); D21H 27/002 (2013.01); B31F 2201/0733 (2013.01); B31F 2201/0735 (2013.01); B31F 2201/0738 (2013.01); Y10T 428/24455 (2015.01)

(58) Field of Classification Search
CPC ............... B31F 1/07; B31F 2201/0733; B31F 2201/0735; B31F 2201/0738; B29C 59/04; D21H 27/002; Y10T 428/24455
USPC ....................................... 425/385
See application file for complete search history.

(56) References Cited

U.S. PATENT DOCUMENTS

| 6,348,131 | B1 | 2/2002 | Kershaw et al. |
| 6,455,129 | B1 | 9/2002 | Kershaw et al. |
| 6,572,722 | B1* | 6/2003 | Pratt ................ B31F 1/07 156/209 |
| 6,733,626 | B2 | 5/2004 | Ruthven et al. |
| 6,887,349 | B2 | 5/2005 | Ruthven et al. |

(Continued)

FOREIGN PATENT DOCUMENTS

EP 0955157 A2 11/1999
WO 2009010092 A1 1/2009

Primary Examiner — Seyed Masoud Malekzadeh
(74) Attorney, Agent, or Firm — Breiner & Breiner, L.L.C.

(57) ABSTRACT

The embossing unit includes at least one embossing roller with a rotation axis and a substantially cylindrical surface with a plurality of embossing protuberances with linear extension; a pressure roller with a yielding surface; an embossing nip defined between the pressure roller and the embossing roller; a feed path of a web material extending through the embossing nip. Along the linear extension thereof the embossing protuberances have a variable inclination with respect to the rotation axis of the embossing roller and a variable cross section along the longitudinal extension of the embossing protuberances.

16 Claims, 12 Drawing Sheets

(56) References Cited

U.S. PATENT DOCUMENTS

| | | |
|---|---|---|
| 7,037,406 B2 | 5/2006 | Kershaw et al. |
| 7,182,838 B2 | 2/2007 | Ruthven et al. |
| 7,294,231 B2 | 11/2007 | Kershaw et al. |
| 7,326,322 B2 | 2/2008 | Ruthven et al. |
| 7,531,062 B2 | 5/2009 | Kershaw et al. |
| 7,678,034 B2 * | 3/2010 | Wilhelm .................. B31F 1/07 492/31 |
| 7,857,941 B2 | 12/2010 | Ruthven et al. |
| 8,142,617 B2 | 3/2012 | Ruthven et al. |
| 2003/0026950 A1 | 2/2003 | Kershaw et al. |
| 2006/0286885 A1 | 12/2006 | Schuh et al. |
| 2009/0134534 A1 * | 5/2009 | Koivukunnas ........ B29C 59/026 264/1.33 |
| 2010/0183850 A1 * | 7/2010 | Sauter ....................... B31F 1/07 428/172 |

* cited by examiner

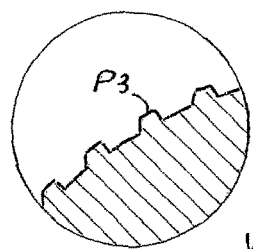
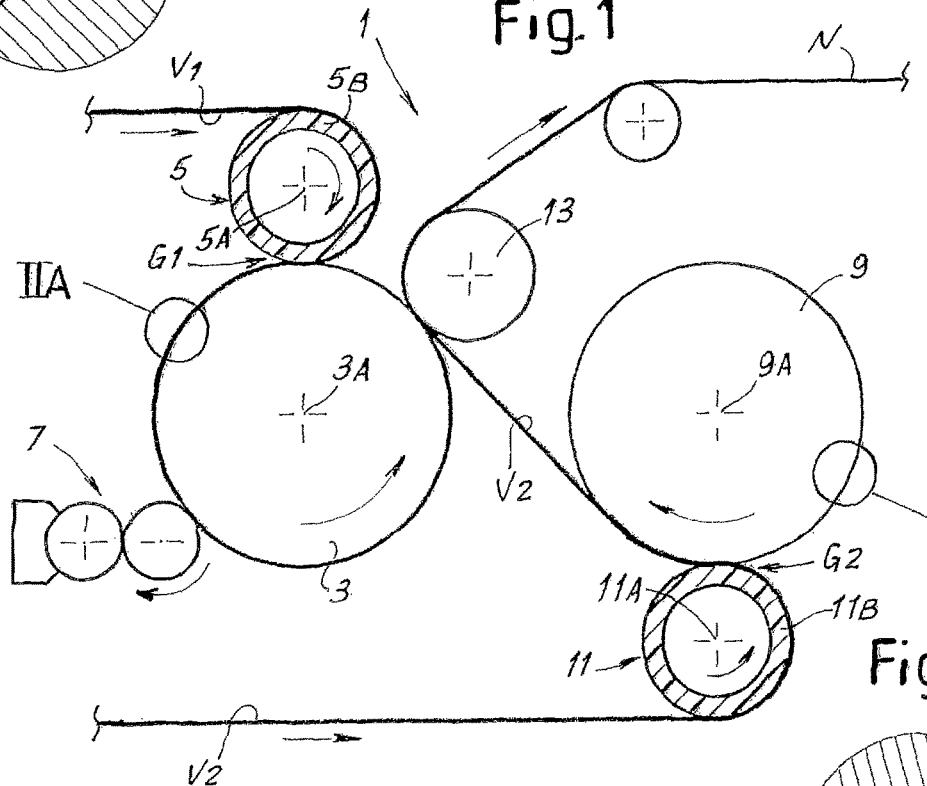
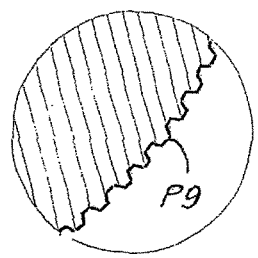
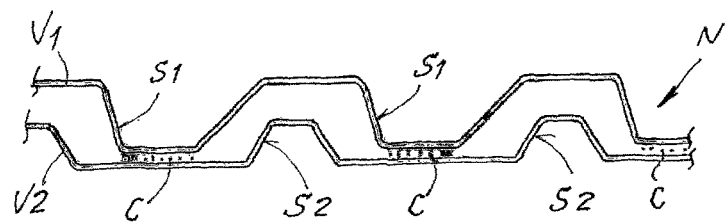

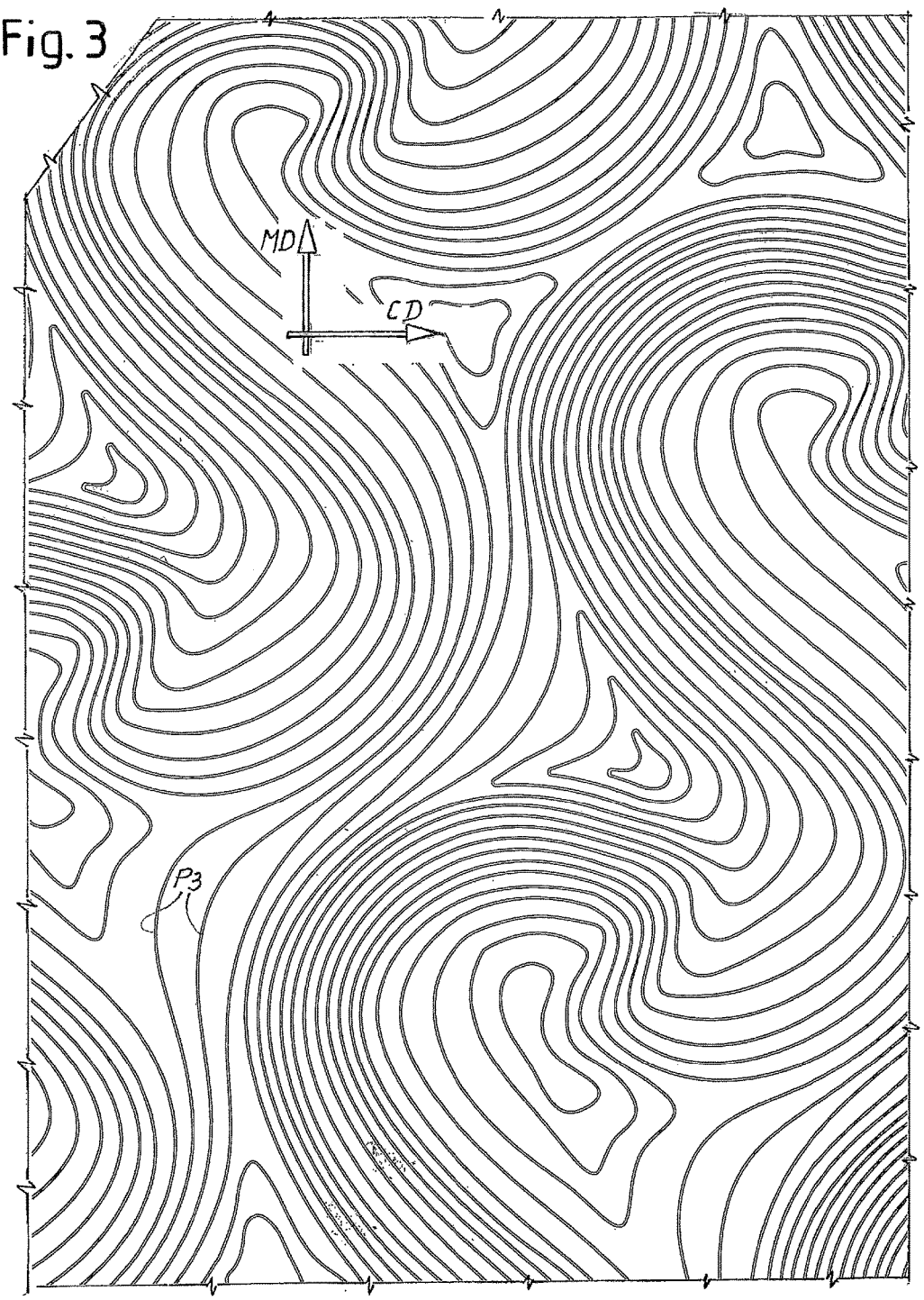

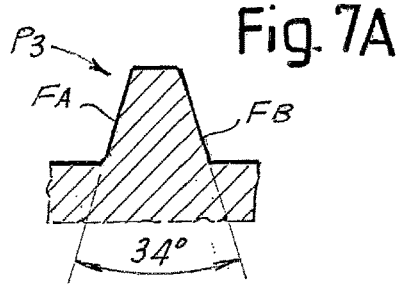
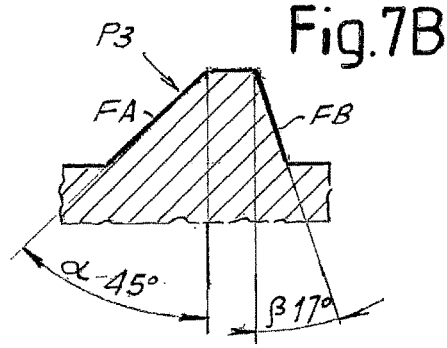
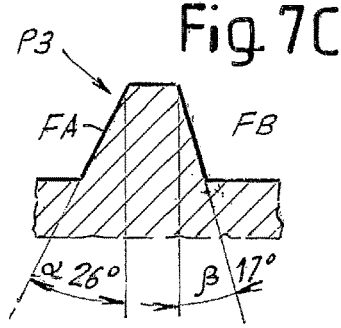
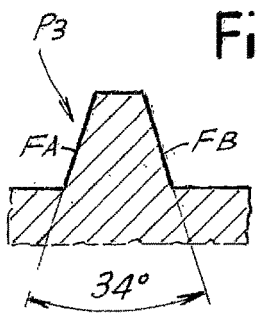
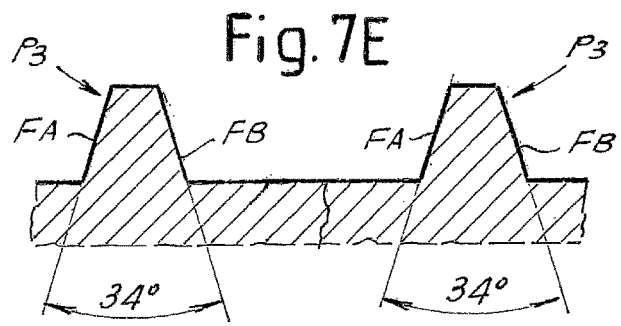
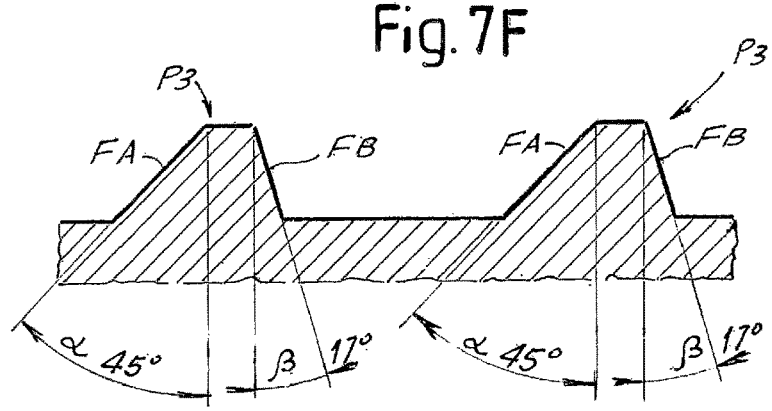

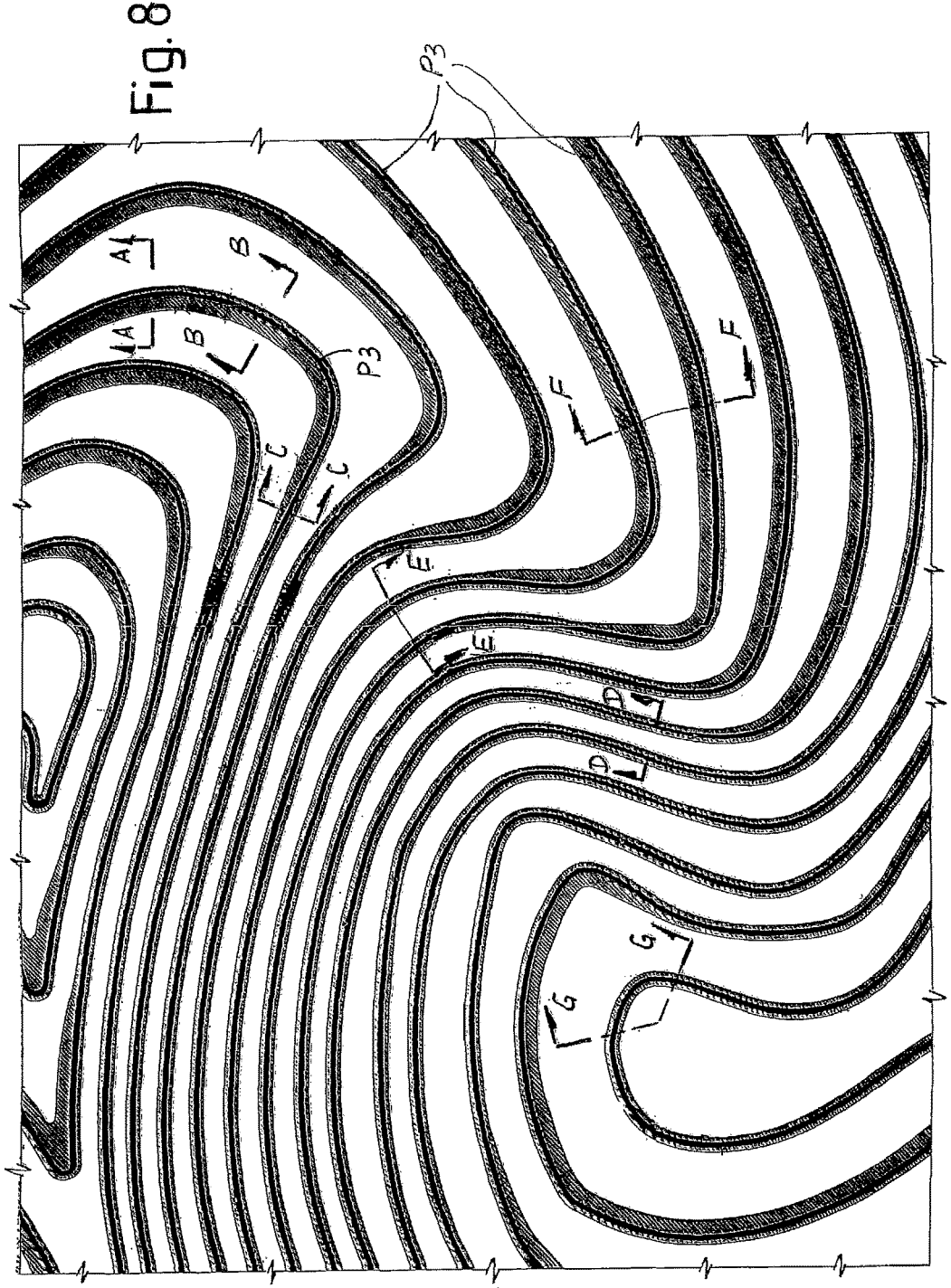
Fig. 8
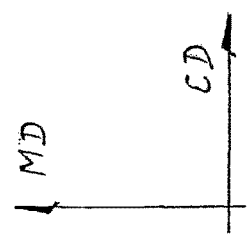

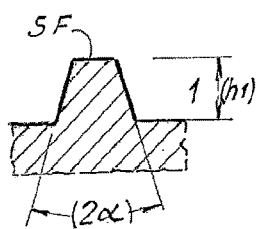
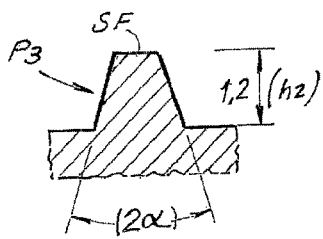
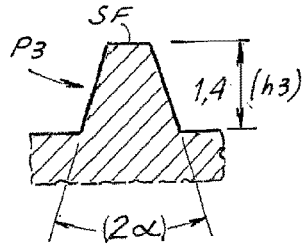
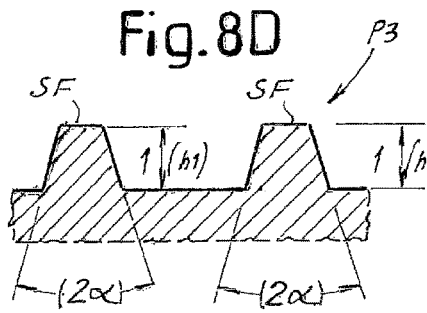
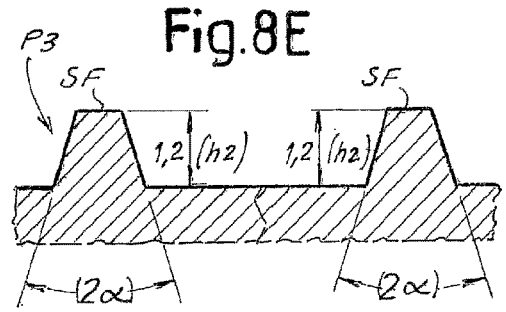
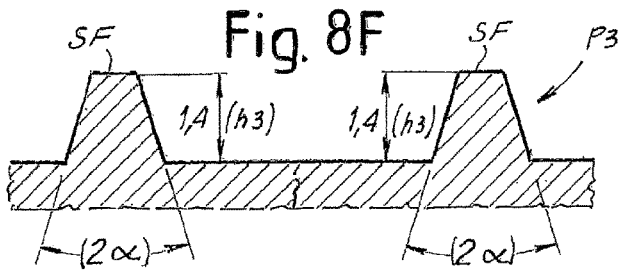
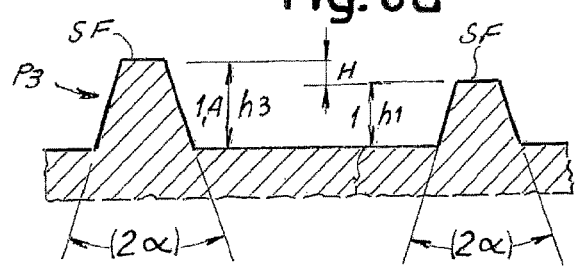
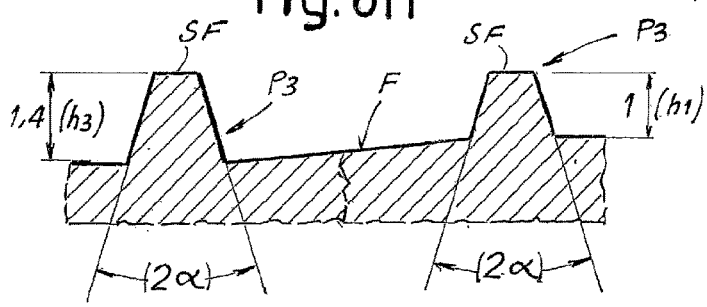

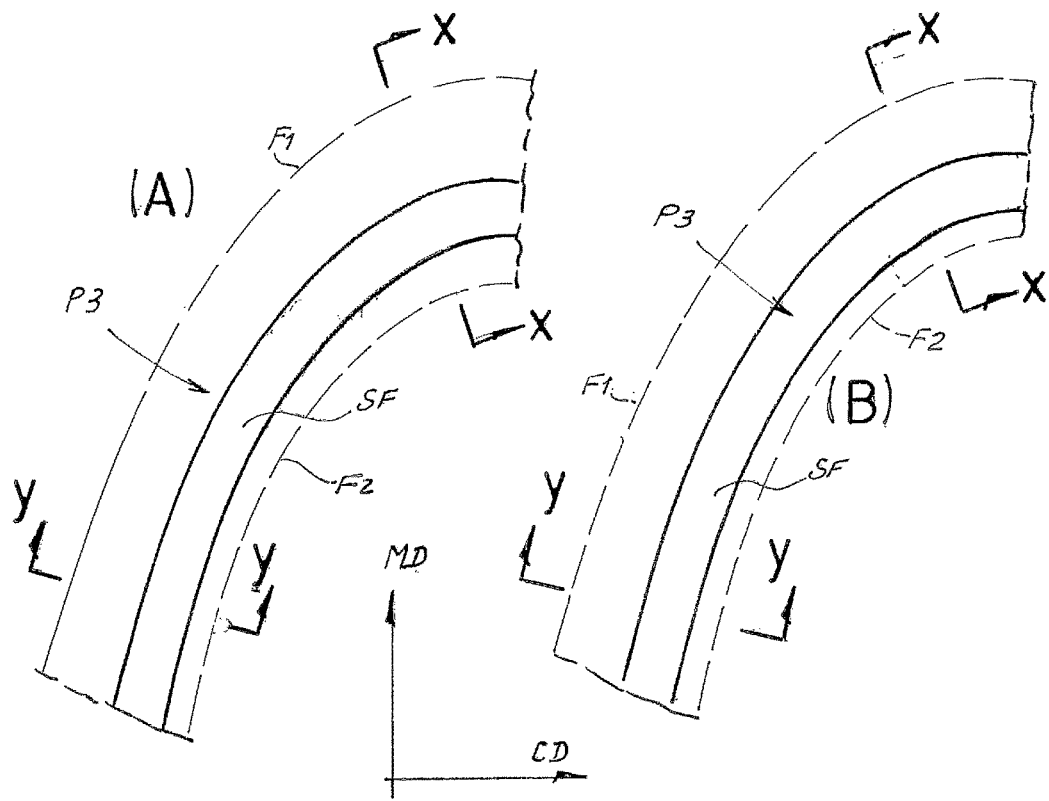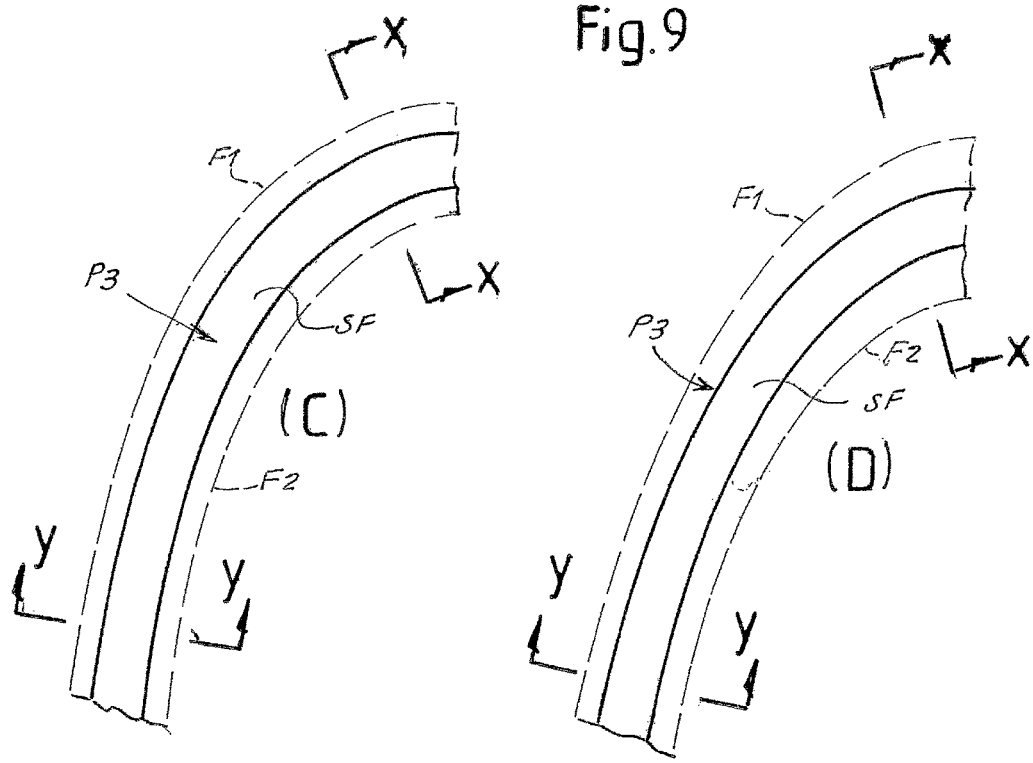
Fig. 9

X—X  Fig.10  Y—Y
(A) 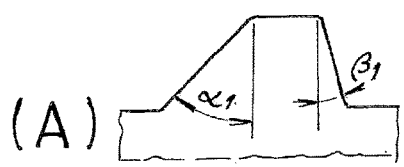 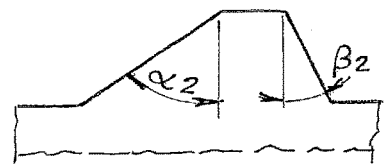
(B₁)  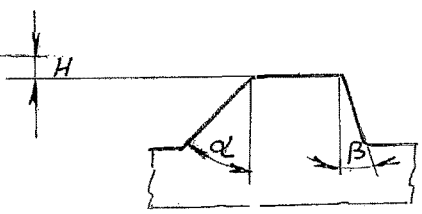
(B₂) 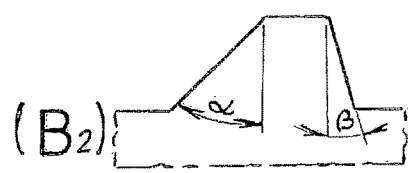 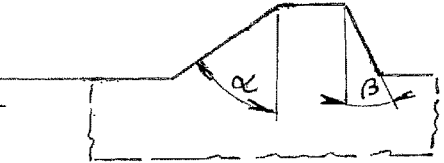
(C₁)  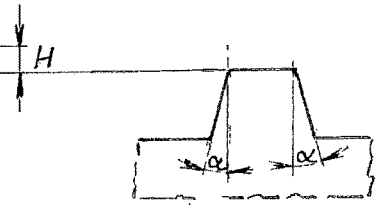
(C₂) 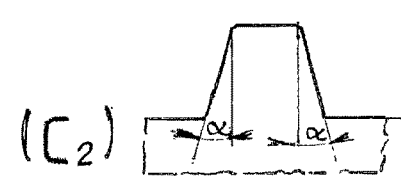 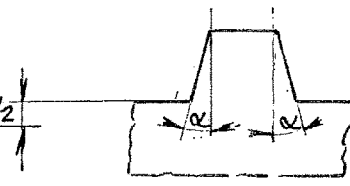
(D) 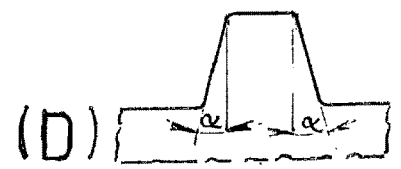 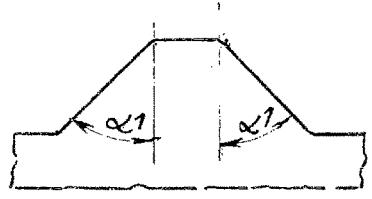

(A)  (B)

EMBOSSING ROLLER, EMBOSSING UNIT, EMBOSSING METHOD AND EMBOSSED PRODUCT

TECHNICAL FIELD

The present invention relates to the field of tissue or crepe paper production, in particular toilet paper, kitchen towels, disposable handkerchiefs or napkins and the like. More in particular, the invention relates to improvements to embossing units and to embossing methods for mechanically processing tissue paper.

BACKGROUND ART

Crepe paper or tissue paper is used to produce various articles for household and domestic, professional and also industrial use. In particular, tissue paper is used to make toilet paper, kitchen paper and other products in roll or sheet form. In many applications, the tissue paper is subjected to a mechanical embossing process. The embossing process in substance consists in feeding a single or multiple ply of tissue paper through a nip defined between an embossing roller and a pressure roller. The embossing roller is provided with protuberances, which cooperate with the surface of the pressure roller. In some embodiments the embossing roller and the pressure roller are both made of hard material, such as steel, and are respectively provided with protuberances and cavities that mesh with each other.

In other more widespread embodiments, the embossing roller is provided with protuberances that penetrate an elastically yielding coating layer provided on the pressure roller, deforming it with respect to the substantially smooth cylindrical shape that this layer assumes when the pressure roller is at rest and not in contact with the embossing roller. The two rollers are pressed against each other so that the protuberances penetrate the lateral surface of the pressure roller as a result of the compressive deformation of the yielding coating of said pressure roller. The cellulose material, forming the web material, which passes through the nip formed between the two rollers, is permanently deformed with the formation of embossing protrusions having a pattern corresponding to that of the embossing protuberances of the embossing roller.

Embossing causes high mechanical stress and localized breakage of the cellulose fibers of the paper ply.

Embossing is used both for aesthetic reasons, in order to decorate the ply of paper, and above all for technical-functional reasons, for example in order to create, for example, mutual gluing areas between several plies forming a multiply web material. The glue is applied to the outer surfaces of the embossing protrusions so as to obtain application of the glue to limited areas. Embossing is also used to modify, alter or improve specific characteristics of the tissue paper, such as thickness, softness and absorption capacity.

Due to the high stress to which the cellulose fibers forming the ply are subjected in the areas in which the cellulose ply is deformed by embossing, the shapes of the embossing protuberances, their dimensions and their arrangement cannot be chosen at will, but rather specific restrictive criteria that impose constraints to the choice of the embossing pattern must be taken into account. Therefore, when producing a new embossing pattern it is always necessary to find a compromise between the technical-functional requirements, with which the pattern must comply, and the requirements of not subjecting the paper to excessive stress, as otherwise this could cause localized breakage or excessive weakening of the cellulose material.

The embossing rollers are engraved on their cylindrical surface to generate the embossing protuberances. Early engraving techniques involved mechanical machining, by chip removal. More modern engraving techniques are based on the use of laser and chemical etching. With embossing rollers engraved using old engraving techniques (for example with the formation of truncated pyramid shaped protuberances) the deformation of the ply of cellulose material that is obtained is uniformly distributed. Vice versa, weakening of the same ply is non-homogeneous, due to the arrangement of the cellulose fibers, which is not isotropic, as will be explained below.

With the current engraving techniques (by chemical etching and of variegated shape), the appearance of the embossing pattern is greatly improved, but the ply is no longer deformed uniformly; therefore, in addition to non-homogeneous weakening, this also causes non-homogeneous elongation of the ply, which leads to the formation of wrinkles, localized loosening and slippage of the ply being processed.

As known to those skilled in the art, tissue paper is normally produced with wet or water-based processes. A slurry of water and cellulose fibers with a dry percentage of less than 5% and typically in the order of 2-4% is produced in a refiner. After adding any necessary additives, for example moisture-resistant resins, dyes or the like, the slurry is distributed from headboxes onto a forming fabric or a forming felt. Through subsequent steps, the water is gradually drained from the layer of slurry formed on the forming fabric or felt to increase the percentage of dry matter inside the layer of slurry. After reaching a percentage of dry matter sufficient for the layer of cellulose material thus formed to have adequate mechanical strength, the layer of fibers is passed to drying means, such as a Yankee cylinder, a series of dry rollers or the like.

As a result of the method in which the fibers are distributed on the forming fabric, through a continuous flow of slurry from the linear nozzles of the headboxes, with a direction of feed concordant with the direction of feed of the forming fabric, although in the slurry the fibers assume a totally random orientation, once the slurry has been distributed on the forming fabric the majority of the fibers are arranged with a preferential orientation in machine direction, i.e. in the direction parallel to the direction of travel of the forming fabric. This ensures that the finished cellulose material has non-isotropic mechanical strength characteristics, and more specifically a lesser strength in cross direction and a greater strength in longitudinal direction, i.e. in machine direction. This poses further limitations to the shape and orientation of the embossing protuberances and of the embossing protrusions which will be generated on the cellulose material.

Normally, the protuberances and consequently the embossing protrusions on the paper have simple geometric shapes, typically truncated pyramid or truncated cone shapes. In some cases, embossing follows more complex patterns with embossing protuberances on the rollers and embossing protrusions on the paper having a linear trend, but nonetheless of limited length.

EP-A-0955157 discloses a method and a device for embossing and joining the plies to produce a multiple ply web material.

US-A-2006/0286885 and EPj-A-1708872 discloses embossed products having embossing protuberances with dot-shaped geometry, which have side surfaces with a different inclination on different sides of the protuberance.

SUMMARY OF THE INVENTION

According to a first aspect the invention concerns an embossing roller having innovative characteristics that make it possible to overcome, either completely or partly, at least one or more of the problems and of the limits of prior art embossing rollers. In particular, the object of an embodiment of the invention is to provide an embossing process, an embossing unit and an embossing roller that make it possible to obtain uniform deformation, and therefore uniform weakening, of the cellulose ply.

In substance, the invention provides an embossing unit comprising at least one embossing roller on the substantially cylindrical lateral side of which embossing protuberances with linear extension are provided. The embossing unit can also comprise a pressure roller with a yielding surface, for example formed by a yielding coating layer preferably made of an elastic material, such as a synthetic rubber. In other embodiments the pressure roller can be made of a rigid material and provided with cavities cooperating, i.e. meshing, with the embossing protuberances. In further embodiments, the pressure roller can be substituted by a different pressure member, for example a belt pressed against the embossing roller.

An embossing nip is defined between the pressure member and the embossing roller, wherein the embossing roller and the pressure member are pressed against each other so that the protuberances of the embossing roller locally compress the yielding coating layer of the pressure roller, penetrating the surface of the coating layer.

The embossing unit also comprises a feed path of a web material, said path extending through the embossing nip.

Along the linear extension thereof, the protuberances have a variable inclination with respect to the rotation axis of the embossing roller. Moreover, the protuberances have at least one variable stress-related characteristic along the longitudinal extension of said protuberances.

According to another aspect, the invention relates to an embossing roller with a rotation axis and a substantially cylindrical surface comprising a plurality of embossing protuberances with linear extension, wherein along the linear extension thereof, the embossing protuberances have a variable inclination with respect to the rotation axis of the embossing roller. Moreover, the embossing protuberances have at least one variable stress-related characteristic along the longitudinal extension of said embossing protuberances.

Inclination of the linear protuberance with respect to the rotation axis of the embossing roller in a point of the linear protuberance is intended as the angle formed between the tangent to the centerline of the protuberance in the point considered and a straight line passing through this point and parallel to the rotation axis of the roller. Therefore, a protuberance with a variable inclination with respect to the rotation axis is a protuberance in which the straight line tangent to the centerline in different points of the protuberance forms different angles with respect to the axis of the embossing roller, i.e. with respect to the straight line parallel to said axis and passing through the point of tangency.

In other words, the protuberances have a variable inclination with respect to the axial direction of the roller.

The web material is fed through the embossing nip according to a direction of feed which, according to the technical nomenclature used in the field, will be indicated as machine direction (MD). In the embossing nip the embossing roller has a peripheral speed oriented according to said machine direction, while the rotation axis is oriented in cross direction (CD). The embossing protuberances have a direction with an inclination with respect to the cross direction and to the machine direction that varies along the extension of the respective protuberance.

Stress-related characteristic of the embossing protuberance is intended as a geometric characteristic of the protuberance that determines a mechanical stress of the cellulose fibers of the web material when the latter is embossed in the embossing nip between the embossing protuberance and the pressure roller.

According to a different aspect, the invention relates to an embossing unit comprising: at least one embossing roller with a rotation axis and a substantially cylindrical surface with a plurality of embossing protuberances with linear extension; a pressure member, for example a pressure roller, optionally provided with a yielding surface; an embossing nip defined between the pressure member and the embossing roller; a feed path of a web material extending through the embossing nip. According to the invention, along their linear extension the embossing protuberances have a variable inclination with respect to the rotation axis of the embossing roller and also have a cross section of variable shape along the linear extension thereof. The variation of the cross section causes a variation of the stress-related characteristic, as varying the geometric shape of the embossing protuberance causes a modification of the degree or the type of embossing, and consequently of the stress, i.e. the mechanical stress applied to the web material subjected to embossing in the nip between the embossing roller and the pressure roller. The invention also relates to the embossing roller as defined herein, independently from the characteristics of the embossing unit.

The cross section can vary in shape, size, or both of these characteristics.

The cross section of the embossing protuberance in a given point of the linear extension of said protuberance is given, in substance, by the intersection between the protuberance and a geometric plane orthogonal to the straight line tangent to the centerline of the protuberance in the point considered.

The centerline of a protuberance can be represented by the line that passes through the center of the front surface of the protuberance, or by the line that passes through the center of mass of the cross section of the protuberance.

According to advantageous embodiments, at least one stress-related characteristic or the cross section of the protuberance can vary according to the inclination of the embossing protuberance with respect to the rotation axis of the embossing roller, or with respect to the circumferential direction, i.e. the machine direction.

The embossing protuberances have a front surface, a first lateral surface defining a first side forming a first angle of inclination with a radial direction orthogonal to the rotation axis of the embossing roller, and a second lateral surface defining a second side forming a second angle of inclination with said radial direction. The inclination of the side can vary along the extension of the embossing protuberance. In general, the inclination of the side in a given cross section of the protuberance is given by the angle formed between the line of intersection of the lateral surface with the sectional plane and a straight line orthogonal to the rotation axis of the embossing roller passing through the line of intersection. The smaller this angle, the greater the inclination of the side. In other words, the more inclined side is a "steeper" side.

The side can be rectilinear, or can have a preponderant rectilinear portion and end areas connected with a greater or lesser radius to the bottom of the cavity between adjacent embossing protuberances and to the front or head surface of the protuberance. In this case, the line of intersection of the lateral surface of the protuberance with the cross sectional plane, i.e. the plane orthogonal to the straight line tangent to the centerline of the protuberance in the point considered, is a portion of straight line, which can have curvilinear portions for connection to the foot of the protuberance and to the front surface of the protuberance.

In other embodiments the profile of the side can be curvilinear, either convex or concave, or partly convex and partly concave. In this case, the line of intersection between the lateral surface defining the side of the protuberance and the cross sectional plane is a concave curve, a convex curve, or a partly convex and partly concave curve. The curve defining the side has an inclination generally variable from the base to the top of the embossing protuberance. In this case the inclination is determined, in each point of the curve defining the side of the protuberance, by the angle formed between the straight line orthogonal to the rotation axis of the embossing roller passing through said point and the tangent in said point to the curve defining the side.

Preferably, the lateral surfaces of the linear protuberances are substantially flat, in the sense that they define a rectilinear intersection with the cross sectional plane.

In some embodiments, the stress-related characteristic comprises one or other or both the angles of inclination of the sides of the protuberance, variable along the longitudinal extension of the respective linear protuberance. The inclination of the side of the protuberance is correlated to the degree of embossing and therefore to the mechanical stress induced in the cellulose material as the steeper the side, i.e. the smaller the angle formed by the side with respect to the radial direction, the more concentrated the deformation of the cellulose fibers induced by embossing. Consequently, the stress on the cellulose fibers is greater. A less steep side causes a lower concentration of the deformation and therefore a distribution of the elongation of the cellulose material over a larger surface, resulting in less stress on the fibers.

By modifying the angle of inclination of the side of an embossing protuberance along the longitudinal extension thereof it is thus possible to modulate the stress imposed on the cellulose material. By gradually increasing the angle formed by the side with respect to the radial direction, the stress imposed on the web material is gradually decreased.

Having different inclinations for the two sides of the embossing protuberance, it is possible to impose on the web material different stresses on the two sides of the protuberance.

These possible modulations are particularly advantageous, as they enable modulation of the stress applied to the web material according to the shape and/or to the orientation (i.e. the inclination) of the embossing protuberance with respect to the machine direction or to the cross direction. As the shape and/or the inclination can vary along the extension of the embossing protuberance, by varying the inclination of one, of the other or of both the sides, it is possible to adapt the stress conditions of the cellulose material to the shape and/or to the orientation or inclination of the protuberance.

In particular, as has been observed, the tensile strength of a sheet of cellulose material is not the same in all directions. Due to the way in which the ply of cellulose fibers is formed, especially if a wet process is used, the strength of the cellulose material is greater in longitudinal direction (machine direction) than in cross direction. Consequently, the smaller the angle formed between the machine direction and the embossing protuberance, the lesser the degree of embossing that can be applied without exceeding the breaking point of the material. In fact, an embossing line parallel to the machine direction generates a tensile stress in the cellulose material in cross direction, i.e. in the direction with less strength. Vice versa, an embossing line orthogonal to the machine direction generates a tensile stress in the cellulose material in machine direction, i.e. in the direction of maximum tensile strength. However, embossing lines orthogonal to the machine direction cause malfunctions during operation, as they trigger shuddering and vibrations. It is therefore necessary to provide for protuberances, which at least in part do not extend orthogonal to the machine direction.

According to advantageous embodiments of the invention, therefore, the inclination of the side of a protuberance can vary in an manner inversely proportional to the angle of inclination of the protuberance with respect to the machine direction, i.e. with respect to the direction orthogonal to the axis of the embossing roller. Inversely proportional variation is not intended as a linear variation according to the inclination, but a generic correlation, in which a lesser inclination of the protuberance with respect to the machine direction corresponds to a larger angle of the side of the protuberance with respect to the radial direction, i.e. a side that is more distended or less steep. As the machine direction is oriented at 90° with respect to the axis of the roller, the inclination of the side of an embossing protuberance varies in a manner directly proportional to the inclination of the protuberance with respect to the axis of the roller: the more the direction of the protuberance is inclined with respect to the axial direction, i.e. the more the direction of the protuberance diverges from the direction of the axis of the roller, the less steep the side surface thereof (and therefore forms a larger angle with the radial direction).

The inclination of the side is the preferred stress-related characteristic as it is easier to control during engraving of the embossing roller, for example with a laser and acid etching engraving system, known to those skilled in the art. However, alternatively to or in combination with this characteristic, other geometric variables or characteristics of the embossing protuberance can be provided, which have a correlation with the mechanical stress applied to the cellulose material.

According to some embodiments of the invention, the stress-related characteristic can be represented by the height of the embossing protuberance.

Height of the protuberance is intended as the protrusion of the front surface of the protuberance with respect to a cylindrical surface of reference. Therefore, an embossing protuberance with a variable height is a protuberance whose front surface has a distance from the rotation axis of the embossing roller that varies along the linear extension of the protuberance, said stress-related parameter being constituted by said distance or comprising said distance together with any further parameters.

The embossing protuberances are separated from one another by engraved channels. Each engraved channel is defined between two adjacent embossing protuberances and has two lateral walls constituted by opposed sides of the two adjacent protuberances, and a bottom. The protuberances extend from the bottom of the channel to the front surface or head of the protuberance. The intersection between the bottom of the channel and the side surface of the protuberance is defined as the foot of the protuberance.

According to some embodiments of the invention, a stress-related characteristic is defined by (or comprises) the depth of the channel between adjacent protuberances and therefore by the length of the opposed sides of adjacent embossing protuberances. This variation of the depth of the channel corresponds to a variation of the radial extension of the side of the protuberance toward the axis of the embossing roller. Said stress-related characteristic is different from the height of the protuberance. In fact, while the variation of the height of the protuberance is given by a variation of the distance between the head or front surface of the protuberance and the axis of the embossing roller, the radial extension toward the rotation axis of the side surface of the protuberance leaves the position of the head of the protuberance, and consequently the distance thereof from the axis of the embossing roller, unvaried. The variation of the stress-related quantity is obtained in this case by engraving a cylindrical surface with a greater or lesser depth, thus generating side surfaces extending to a greater or lesser degree toward the inside of the cylinder, while the head of the protuberance at the end of machining will remain on a geometric surface of cylindrical shape with a circular section. Vice versa, when the height of the protuberance is varied, the front surface or head of the protuberance no longer lies on a cylindrical geometric surface with circular section, but is lowered radially with respect to said geometric surface in the areas of lesser height of the protuberance.

While a variation of height of the protuberance, the engraving depth remaining equal, causes a variation of the length of the side surfaces on both sides of the protuberance, a variation of the engraving depth and therefore of the radial extension of the side surfaces, can be produced so that opposite side surfaces of a same embossing protuberance have different depths. The two parameters (height of the protuberances and depth of the cavities) can be varied in combination with each other to obtain a variation of a more complex stress-related characteristic.

According to some embodiments, the stress-related quantity varies along the linear extension of the embossing protuberance. According to other embodiments, in combination with or alternatively to the variation along the linear extension of the protuberance, the stress-related quantity can vary on the two sides of the protuberance. In particular, when the stress-related quantity comprises the inclination of the side, the two opposed sides of the embossing protuberance can have different inclinations with respect to the radial direction, inclination which remains constant, or which can vary along the linear extension of the embossing protuberance. Likewise, when the stress-related quantity comprises the depth of the sides, the two sides of the protuberance can have different depths.

In some embodiments, when the linear protuberances have a curvilinear shape, it is advantageous for the stress-related characteristic to be different on the two sides or side surfaces of the protuberance and, more in particular, it is advantageous for the shape of the protuberance to be such that the stress-related characteristic is such as to reduce the stress of the cellulose material on the extrados of the curve, i.e. on the side toward which the convexity of the curve defined by the embossing protuberance is oriented. For example, if the stress-related quantity comprises the inclination of the side of the embossing protuberance with respect to the radial direction, it is advantageous for the side, which is external to a curve formed by the embossing protuberance, i.e. the side on the extrados of the curve, to be more inclined with respect to the radial direction (and therefore less steep) with respect to the side in the intrados, i.e. with respect to the side internal to the curve. In this way the greater inclination of the side with respect to the radial direction, i.e. the decreased steepness of the side, offsets the increase in stress due to the curvature.

In fact, other parameters remaining equal, the stress applied to the cellulose material by a curvilinear embossing protuberance is greater on the extrados than on the intrados of the curve formed by the embossing protuberance due to the different radii of curvature. This difference is offset by adopting different stress-related characteristics (for example the slope of the side) for the two sides of the protuberance.

In practice, according to some embodiments, in at least some cross sections of at least some of the protuberances the sides of said protuberances have non-symmetrical shapes with respect to a centerline of the cross section.

In general, according to one aspect of the invention, the protuberances have a cross section of variable shape or dimension along the linear extension thereof. The variation of this shape or dimension determines a variation of the stress-related characteristic. In other words, the stress-related characteristic can be given, in a general sense, by the shape or dimension of the cross section. In practice, along the linear extension of said embossing protuberances the cross section has at least one variable geometric parameter. The variation can be a function of the inclination of the protuberance with respect to the rotation axis of the embossing roller.

The linear embossing protuberances can advantageously be continuous. The term continuous embossing protuberance is intended as an embossing protuberance that does not have ends on the cylindrical surface of the embossing roller or that has an end on the edge of the cylindrical surface. The continuous embossing protuberance is therefore a protuberance that follows a closed line, or a protuberance extending between a first and a second end, which are located on one or on the other of the edges that delimit the engraved area of the embossing roller.

In some embodiments of the invention, the embossing roller comprises in at least one portion of the engraved surface thereof, a plurality of adjacent linear embossing protuberances. Advantageously, in at least one portion of the longitudinal extension thereof, these adjacent embossing protuberances have the side surfaces on one side which are more inclined than the side surfaces on the opposite side.

In some embodiments, the embossing roller comprises a plurality of adjacent linear protuberances having, in at least one part of their extension, concordantly oriented curvatures, i.e. with the extrados oriented in the same direction. In this way adjacent linear embossing protuberances can be arranged so as to be surrounded by one another. In other words, the extrados of one embossing protuberance is facing the intrados of the adjacent embossing protuberance and contained in the space defined thereby.

In some embodiments, in at least some portions of the cylindrical surface of the embossing roller the embossing protuberances are arranged mutually adjacent with a reciprocal distance variable along the linear extension of the embossing protuberances. As a larger or smaller distance between adjacent protuberances determines a lesser or greater concentration of the embossing stress on the cellulose material, it is advantageous that for the stress-related characteristic, i.e. the shape of the embossing protuberances, to be varied in such a manner as to offset the variation of the concentration of the stress determined by the variation of the mutual distance between embossing protuberances, i.e. by the density of the protuberances.

According to a different aspect, the invention relates to an embossing unit comprising: at least one embossing roller with a rotation axis and a substantially cylindrical surface with a plurality of embossing protuberances with linear extension, said protuberances having a front surface and two side surfaces inclined with opposite inclinations; a pressure roller with a yielding surface; an embossing nip defined between the pressure roller and the embossing roller, in said nip the embossing roller and the pressure roller being pressed against each other, the protuberances of the embossing roller penetrating the yielding surface of the pressure roller deforming the layer of yielding coating material of the pressure roller; a feed path of a web material extending through the embossing nip. Advantageously, the embossing roller comprises a plurality of adjacent linear embossing protuberances, and in at least one portion of their longitudinal extension the adjacent embossing protuberances have the side surfaces on one side with a greater inclination with respect to the side surfaces on the opposite side.

According to a further aspect, the invention relates to a method for embossing a cellulose web material comprising the steps of feeding according to a direction of feed the web material through an embossing nip formed between an embossing roller, rotating about a rotation axis and provided with embossing protuberances with linear extension, and a pressure member, the web material being deformed as a result of cooperation between the protuberances of the embossing roller and the pressure member forming embossing protrusions with linear extension in the web material.

According to the invention, the method provides that, along the direction of feed, on the web material embossing protrusions are formed having a variable inclination with respect to the direction of feed, and that the web material is subjected to a variable embossing stress along the linear extension of said protrusions.

The pressure member can, for example, be a pressure roller. The pressure roller can be provided with a yielding cylindrical surface.

The embossing stress is given by the percentage of local deformation of the cellulose material. The embossing stress in a point or portion of the cellulose material is therefore determined by the greater or lesser elongation of the cellulose material in said point or portion of web material.

The embossing protrusions have a pattern substantially corresponding to the pattern of the protuberances that generate them. Therefore, definitions applicable to the sizes, parameters and characteristics regarding the structure and shape of the embossing protuberances are also applied to the embossing protrusions generated by them in the web material. The direction of the rotation axis of the roller corresponds to the cross direction, i.e. to the direction orthogonal to the direction of feed of the web material.

In advantageous embodiments of the method according to the invention, the embossing stress varies according to the inclination of the embossing protrusions with respect to the direction of feed of the web material, i.e. the machine direction.

In some embodiments, an embossing stress is applied to the web material along at least some of the embossing protrusions, which is variable in a direct manner with respect to the inclination of the respective embossing protrusion, a lesser embossing stress applied to the web material corresponding to lesser inclinations of the embossing protrusion with respect to the direction of feed (i.e. to smaller angles formed between the tangent to the embossing protrusion and the direction of feed); a greater embossing stress corresponding to greater inclinations of said embossing protrusion (i.e. to greater angles formed between the embossing protrusion and the direction of feed).

According to preferred embodiments of the invention, the embossing stress is varied along the extension of the embossing protuberances of the embossing roller by providing embossing protuberances with a variable cross section along the linear extension thereof in the manner defined above.

In preferred embodiments of the invention embossing protrusions with a linear trend are produced on the web material, which have a variable shape along the linear extension thereof. In particularly advantageous embodiments of the invention on the web material embossing protrusions are generated, which have a cross section of variable shape along the linear extension thereof.

In some embodiments embossing protrusions of variable height along the linear extension thereof are formed.

In particularly advantageous embodiments of the invention embossing protrusions are formed having at least one side with a variable inclination along the linear extension of the protrusions.

In advantageous embodiments of the method according to the invention, the web material is embossed forming adjacent embossing protrusions thereon. Advantageously, in at least some areas of the web material the embossing protrusions can have a variable reciprocal distance along the extension of the protrusions. Preferably, the web material is embossed with a variable embossing stress or degree of embossing according to the reciprocal distance between said embossing lines.

According to a further aspect the invention relates to a cellulose web material, typically crepe paper or tissue paper, in particular but not exclusively an endless web material for example wound in a log, comprising at least one ply embossed with a plurality of linear embossing protrusions, wherein the embossing protrusions have a variable inclination along a longitudinal direction of the web material and wherein the web material has a variable embossing stress or degree of embossing along the extension of the embossing protrusions.

In some embodiments the cellulose fibers that form the material have a preferential direction of orientation, said preferential direction of orientation being the longitudinal direction of the web material. The degree of embossing is in practice determined by the percentage of deformation of the web material with respect to the original dimensions (prior to embossing) and/or by the percentage of breakage of the cellulose fibers. An elongation of greater percentage in a given portion of material indicates a greater degree of embossing or embossing stress. An elongation of lesser percentage indicates a lesser degree of embossing or embossing stress. In fact, embossing is obtained by localized deformation by elongation of the cellulose material. A greater degree of embossing in a portion, area or section of the material indicates a greater stress and consequent greater percentage of elongation of the material in said portion.

The inclination of the side in a point of the embossing protrusion (inclination which can vary along the extension of the embossing protrusion) is defined as the angle formed between the direction orthogonal to the web material (when this is arranged lying flat on a surface) and the line of intersection between the side surface and a sectional plane orthogonal to the embossing protrusion in the point considered. The sectional plane is the plane orthogonal to the straight line tangent to the centerline of the embossing protrusion. The centerline can be considered the central line of the front surface of the embossing protrusion.

In advantageous embodiments the material has a degree of embossing of the embossing protrusions that varies according to the inclination of the said embossing protrusions with respect to the longitudinal direction. Preferably, the degree of embossing, i.e. the localized percentage of elongation, increases with the increase of the angle formed between the tangent to the centerline of the linear embossing protrusion and the longitudinal direction.

In fact, if the longitudinal direction coincides with the machine direction according to which the web material was produced and processed, the tensile strength of the cellulose fibers is greater in machine direction and lesser in cross direction. A linear embossing protrusion is obtained by localized elongation of the basic cellulose material according to a direction substantially orthogonal to the longitudinal direction of the embossing protrusion. In fact, the material is elongated along the side of the embossing protuberances which generate the side of the embossing protrusions on the material. If the projection has a substantially parallel or slightly inclined development with respect to the machine direction, i.e. to the longitudinal direction of the web material, it was generated by stressing the material with a tension in a prevalently cross direction, along which the material has a lesser tensile strength. Therefore, the degree of embossing and consequently the embossing stress is advantageously modulated so as to be lesser the lesser the inclination of the embossing protrusion with respect to the longitudinal direction of the web material. The inclination of the embossing protrusion in a point is given by the angle formed between the longitudinal direction and the straight line tangent to the centerline of the embossing protrusion.

Advantageously, in at least some portions of the web material the embossing protrusions can be adjacent to one another and have a variable reciprocal distance. Preferably, in this case the degree of embossing varies according to the reciprocal distance between adjacent embossing protrusions.

The embossing protrusions can have a curvilinear shape with extrados and intrados. In this case it is advantageous to provide a different degree of embossing or embossing stress on the two sides of the protrusion. A greater degree of embossing is provided on the intrados and a lesser degree of embossing is provided on the extrados of the curve defined by the embossing protrusion.

At least some embossing protrusions can have a variable depth along the linear extension thereof. The depth of the embossing protrusions can be greater in the areas in which the inclination of the embossing protrusions with respect to the longitudinal direction is greater and vice versa.

In some embodiments, at least some embossing protrusions have at least one side, the inclination of which varies along the linear extension thereof. Advantageously a less steep side of the protrusion can be provided in the areas in which the embossing protrusion has a lesser inclination with respect to the longitudinal direction and vice versa. In other words the larger the angle between protrusion and longitudinal direction, the steeper the side, and vice versa. As indicated above, the parameter indicative of greater or lesser steepness of the side surface can be given by the angle between the side surface and the direction orthogonal to the plane of the web material: the larger this angle, the less steep the side surface. This angle corresponds to the angle, measured on the embossing roller, between the side surface of the protuberance and the radial direction.

According to some embodiments of the invention, at least in some portions of the web material the embossing protrusions are arranged mutually adjacent and with concordant curvature, i.e. with the extrados all facing the same way and therefore advantageously arranged with the extrados of one protrusion facing the intrados of the adjacent protrusion and preferably with one protrusion contained inside the concavity formed by the adjacent protrusion. In this way, portions of adjacent embossing protrusions inserted into one another are in practice obtained.

According to a different aspect, the invention provides a cellulose web material comprising a plurality of linear, rectilinear or curvilinear, embossing protrusions, mutually adjacent, each embossing protrusion having a front surface, a first inclined side surface and a second inclined side surface, characterized in that the inclination of said first side surface and second side surface are different from each other.

Advantageously, the adjacent embossing protrusions have all the side surfaces oriented in one direction with a substantially different inclination with respect to the side surfaces oriented in the opposite direction.

According to a further aspect, the invention provides an embosser comprising: at least one embossing roller with a rotation axis and comprising a substantially cylindrical surface with a plurality of embossing protuberances with linear extension; a pressure roller comprising a yielding surface; an embossing nip defined between said pressure roller and said embossing roller, in said nip the embossing roller and the pressure roller being pressed against each other; a feed path of a web material extending through said embossing nip. Along the linear extension thereof, the embossing protuberances have a variable inclination with respect to the rotation axis of the embossing roller. Moreover, the protuberances have a cross section of variable shape along the linear extension thereof.

According to yet another aspect, the invention provides an embossing unit comprising: at least one embossing roller with a rotation axis and comprising a substantially cylindrical surface with a plurality of embossing protuberances with linear extension, said protuberances each comprising a front surface, a first side surface forming a first angle of inclination with a radial direction orthogonal to the rotation axis of the embossing roller, and a second side surface forming a second angle of inclination with said radial direction; a pressure roller comprising a yielding surface; an embossing nip defined between said pressure roller and said embossing roller, in said nip the embossing roller and the pressure roller being pressed against each other; a feed path of a web material extending through said embossing nip. In at least some portions of the linear protuberances the first side surface and the second side surface have different inclinations with respect to a radial direction.

Further advantageous characteristics of the invention are described below with reference to non-limiting embodiments and are set forth in the appended claims, which form an integral part of the present description.

BRIEF DESCRIPTION OF THE DRAWINGS

The invention and all its characteristics and the advantages that can be achieved therewith will be better understood by following the description and accompanying drawings, which show non-limiting practical embodiments of the invention. More in particular, in the drawing:

FIG. 1 shows a diagram of an embossing unit in which the invention can be incorporated;

FIG. 1A shows a local schematic cross section of the web material obtained by an embossing-laminating unit;

FIGS. 2A and 2B show enlargements of the areas indicated with $II_A$ and $II_B$ in FIG. 1;

FIG. 3 shows a plan view of a portion of one of the embossing rollers of the embossing unit of FIG. 1, i.e. a portion of web material obtained by embossing a ply with an embossing roller according to the invention;

FIGS. 7A to 7F show cross sections of the protuberances of the roller shown in FIG. 7 according to the sectional lines indicated from A-A to F-F respectively;

FIG. 8 shows a flattened view of a portion of a surface of an embossing roller according to the invention in a different embodiment;

FIGS. 8A to 8G show cross sections according to the lines from A-A to G-G in FIG. 8;

FIG. 8H shows a section analogous to the section of FIG. 8G in a variant of embodiment;

FIG. 9 shows schematic portions of embossing protuberances in various embodiments;

FIG. 10 shows cross sections according to the lines X-X and Y-Y of FIG. 9 in various embodiments;

DETAILED DESCRIPTION OF EMBODIMENTS OF THE INVENTION

Figure 4:
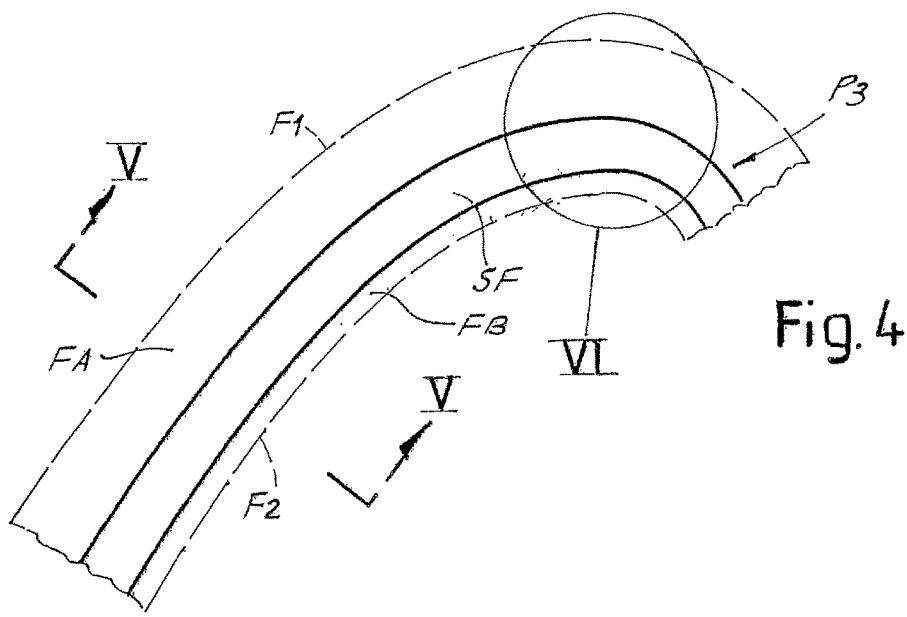
FIG. 4 shows a portion of an embossing protuberance of a roller of an embossing unit according to the invention.

FIG. 1 schematically represents an embossing unit in which the invention can be incorporated. It must be understood that the embossing unit of FIG. 1 is only an example of many different types of embossers in which the present invention can be incorporated. More in particular, the unit of FIG. 1 is actually an embossing-laminating unit of nested type. An embosser-laminator is an embossing unit which also has the function of bonding together, for example by gluing, two or more plies to produce a multiply web material, optionally after embossing one, the other or both the plies forming the web material exiting from the embossing unit. Each ply can in turn be formed by a plurality of cellulose layers.

More in particular, the embossing-laminating unit 1 comprises a first embossing roller 3 rotating about a rotation axis 3A and cooperating with a first pressure roller 5 rotating about a rotation axis 5A and provided with an outer coating 5B made of yielding material, preferably an elastically yielding material, such as synthetic rubber or the like.

The embossing roller 3 comprises a cylindrical lateral surface provided with embossing protuberances P3, shown schematically in detail in FIG. 2A. In a manner known per se, these protuberances P3 penetrate the layer of elastically yielding material 5B of the pressure roller 5 in the embossing nip G1 defined between the first embossing roller 3 and the first pressure roller 5.

Along the circumferential extension of the embossing roller 3 a gluing unit 7 is arranged, which applies glue on the most protruding surface of the ply V1 of cellulose material which, fed around the pressure roller 5, is embossed in the embossing nip G1.

The embossing-laminating unit 1 also comprises a second embossing roller 9 rotating about a rotation axis 9A and cooperating with a pressure roller 11 rotating about a rotation axis 11A and provided with a layer 11B of yielding material, preferably elastically yielding such as synthetic rubber or the like. The second embossing roller 9 forms, with the second pressure roller 11, a second embossing nip G2 through which a second ply V2 of cellulose material is fed. Embossing of the ply V2 takes place, in the same way as embossing of the ply V1, in the embossing nip G2 as a result of penetration of protuberances P9 provided on the lateral cylindrical surface of the second embossing roller 9 (see FIG. 2B).

In the embodiment shown, the embossing or embossing-laminating unit 1 is of the nested type, i.e. designed so that the embossing protrusions formed on the ply V2 by the protuberances P9 are nested in the cavities between the embossing protrusions formed in the ply V1 by the protuberances P3. For this purpose, the ply V2 is detached from the second embossing roller 9 and passed to the first embossing roller 3, so that the two plies V1 and V2 are laminated between the protuberances P3 of the first embossing roller 3 and a marrying roller 13. The marrying roller 13 can be a roller made of a hard material, such as steel, with substantially the same hardness as that of the embossing roller 3 and of the embossing roller 9. In other embodiments the marrying roller 13 can be coated with or made of a softer material, for example with a hardness comprised between that of the embossing roller 3 or of the embossing roller 9 and that of the yielding coating 5B or 11B provided on the pressure rollers 5 and 11.

After bonding of the embossed plies V1 and V2, the web material N formed by two bonded plies is delivered from the embosser or embosser-laminator 1. Each ply of cellulose material V1, V2 can in turn be formed by one, two or more layers of cellulose material couple in a previous step of the converting process, not shown.

FIG. 1A schematically shows a local cross section of the web material N. This section schematically indicates embossing protrusions S1 generated on the ply V1 during passage of the ply V1 through the embossing nip G1 between the embossing roller 3 and the pressure roller 5. A glue C is applied to the front surfaces, facing the inside of the web material N, of the embossing protrusions S1, which causes the ply V1 to adhere to the ply V2. This latter is provided with embossing protrusions S2 represented schematically in FIG. 1A and generated in the embossing nip G2 between the embossing roller 9 and the pressure roller 11.

The pattern of the embossing protrusions S1 and S2 corresponds substantially to the pattern of the embossing protuberances P3 and P9. From the shape of the protuberances P3 and P9, described in detail below in some embodiments, it is easy to understand the shape of the protrusions S1 and S2 that these embossing protuberances form on the plies V1 and V2. It must also be noted that the height of the embossing protrusions S1 and S2 can vary, also using the same embossing protuberances P3 and P9, for example by varying the hardness of the elastically yielding layers 5B and 11B and/or modifying the pressure with which the pressure rollers 5 and 11 press against the embossing rollers 3 and 9, pressure on which the degree of deformation of the elastically yielding coating of the pressure rollers, and therefore the degree of deformation of the cellulose material forming the plies V1 and V2, depend. Therefore, the geometric characteristics that will be defined below with reference to the embossing protuberances have a correspondence in respective characteristics of the embossing protrusions formed in the cellulose plies.

As can be observed in FIG. 1A, the embossing protrusions S2 generated on the ply V2 are inserted in the cavities between consecutive protrusions S1.

The present invention specifically relates to the shapes of the protuberances of at least one of the two due embossing rollers 3 and 9, for example of the embossing roller 3 and consequently the shapes of the embossing protrusions of the web material obtained. These shapes will be described in detail below in various embodiments, with specific reference to the technical-functional results that are obtained with the various possible configurations of the embossing protuberances P3.

Figure 13:
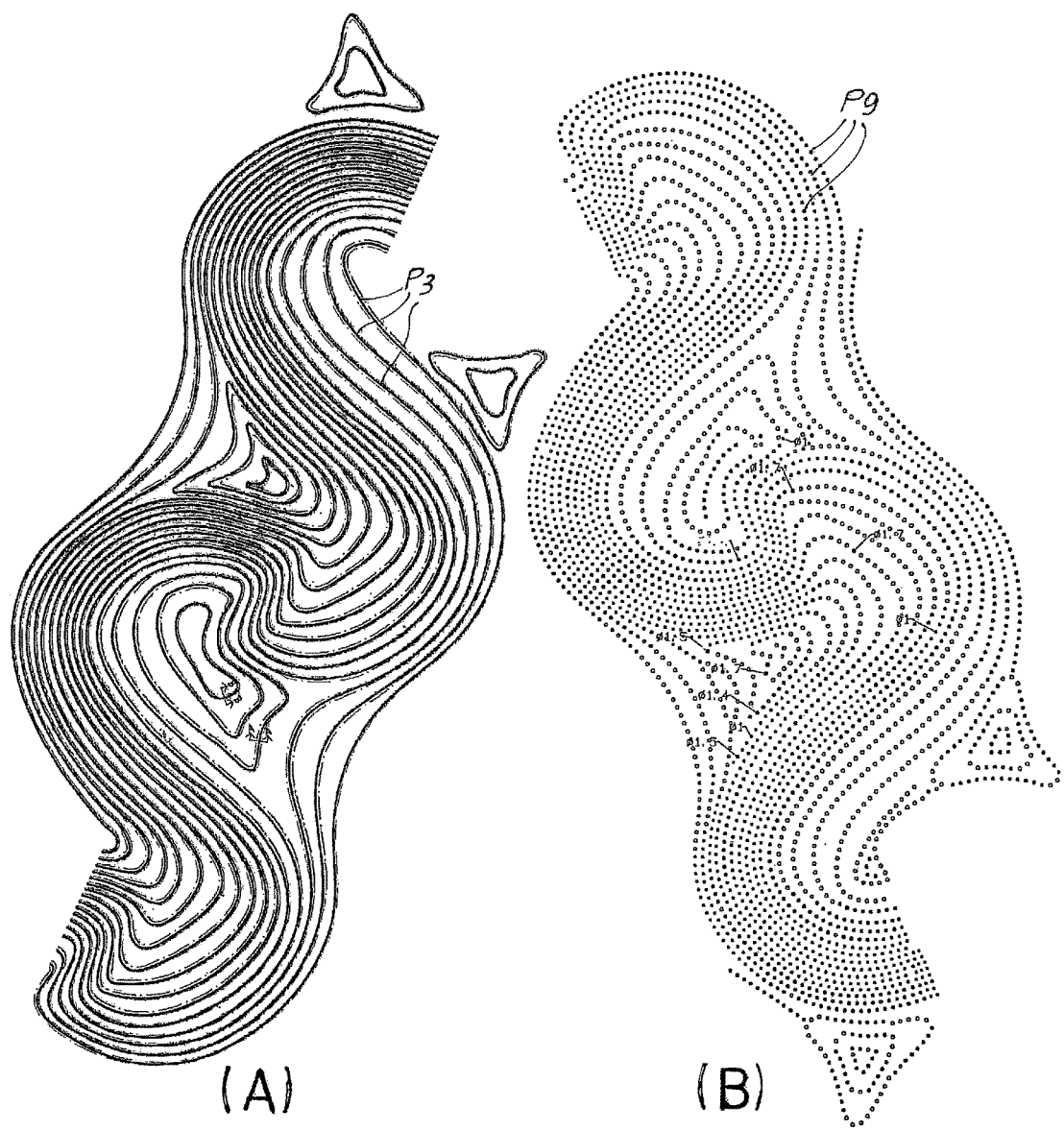
FIG. 13 shows a plan view of the two faces of a web material comprising at least two layers or plies embossed separately and bonded, i.e. a flattened view of two portions of two embossing rollers of an embossing-laminating unit for producing multiple ply web materials.

The embossing protuberances P9 of the second embossing roller 9, which form the embossing protrusions S2 can be much more simply formed by truncated cone or truncated pyramid shaped tips, arranged according to lines the extension, shape and length of which depend on the shape of the protuberances P3 of the embossing roller 3. FIG. 13 shows, purely by way of example, a possible pattern of a portion of the embossing roller 3 (FIG. 13A) and of the corresponding embossing roller 9 (FIG. 13B). FIG. 13 can be seen similarly as a representation of the corresponding embossing protrusions S1, S2 that the protuberances P3 and P9 form on the two plies V1 and V2. As can be observed in FIG. 13A the protuberances P3 have a linear, substantially continuous and curvilinear extension, while the protuberances of the embossing roller 9 schematically shown in FIG. 13B have a truncated cone shape, but are arranged according to alignments that follow the spaces, i.e. the cavities between the protuberances P3 of the embossing roller 3.

FIG. 3 shows an enlargement of a portion of cylindrical surface of the first embossing roller 3, provided with protuberances P3 with substantially continuous, curvilinear and linear shape. FIG. 3 shows the roller portion in a flattened view. The pattern of FIG. 3 can also be seen as a representation of the embossing protrusions formed by the embossing roller on the web material.

As can be observed in FIG. 3, some of these lines are closed on themselves, i.e. form an endless line. Other lines are interrupted along the edges of the pattern. If the whole extension of the cylindrical surface of the embossing roller 3 were to be reproduced, it could be observed that all the protuberances P3 follow lines that close on themselves or that terminate on the end edge of the engraved area of the lateral surface of the embossing roller 3.

In FIG. 3 MD and CD respectively indicate the machine direction (MD) and the cross direction (CD) as defined above. In the embossing nip the machine direction MD is substantially the straight line tangent to the theoretical point of contact between the pressure roller 5 and the embossing roller 3 (the same can be said for the pair or rollers 9 and 11). The cross direction is parallel to the rotation axis of the embossing roller.

Figure 5:
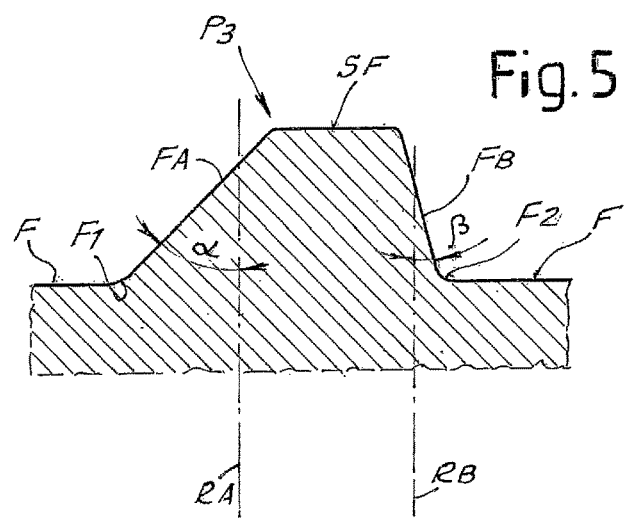
FIG. 5 shows a section according to V-V of FIG. 4.
Figure 6:
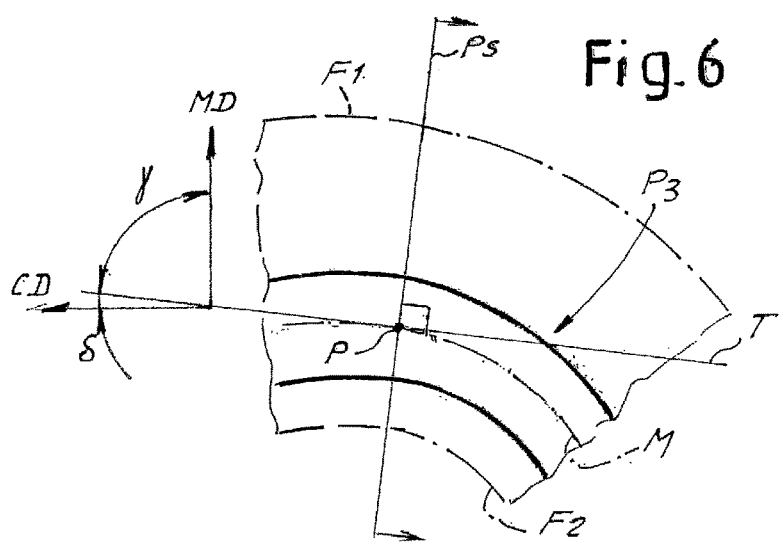
FIG. 6 shows an enlarged plan view of the portion indicated with VI in FIG. 4.

For a better understanding of the present invention, FIGS. 4 to 6 schematically represent a portion of a linear embossing protuberance (FIG. 4), a cross section (FIG. 5) and an enlargement (FIG. 6) of the plan view of the protuberance.

Each embossing protuberance P3 has a front surface SF and two lateral surfaces defining the sides FA and FB of the protuberance. The front surface SF is also defined head of the embossing protuberance. Each lateral surface or side FA, FB extends from the head or front surface SF to the foot of the embossing protuberance P3, which is constituted in substance by the joining point between the side FA, FB and the bottom F of the cavity of the embossing roller 3 that generated the embossing protuberance P3. In FIG. 6 the letter M indicates a centerline lying on the front surface SF of the protuberance P3, at the center of this surface, i.e. the centerline M is the place of the points equidistant from the two geometric lines that delimit the front surface SF. In actual fact, for structural reasons this latter is connected with beveled corners to the two lateral surfaces or sides FA, FB. In any case, two lines delimiting the front surface SF can be geometrically defined, for example as the intersection between a cylindrical surface on which the front surface SF of the protuberance P3 lies and the prolongation of the lateral surface FA or FB of the side of the protuberance.

The protuberance P3 generally has a curvilinear shape, and therefore the centerline M has a variable inclination moving along the longitudinal extension of the protuberance P3, i.e. in each point of the protuberance P3 forms with the direction MD and with the direction CD a variable angle. In FIG. 6 the letter P indicates a generic point of the centerline M. In this point P the straight line T tangent to the centerline M has been traced. The letters PS indicate the sectional plane orthogonal to the tangent T in the point P. The cross section of the linear embossing protuberance P3 in the generic point P is given by the intersection between the protuberance P3 and said plane PS orthogonal to the straight line T tangent to the centerline M as defined above.

In FIG. 6 the machine direction MD is also schematically indicated. The symbol 6 indicates angle between the cross direction CD and the straight line T tangent to the centerline M in the point P, i.e. the inclination of the protuberance in the point P with respect to the cross direction CD. The angle $\gamma$ indicates the inclination of the protuberance P3 in the point P with respect to the machine direction MD, i.e. the angle formed between the tangent straight line T and the direction MD.

FIG. 5 schematically shows the cross section of the protuberance P3 along the sectional plane V-V of FIG. 4. The two sides FA and FB defined by the line of intersection between the lateral surfaces of the protuberance P3 and the cross sectional plane with the line V-V are identified in the cross section. The inclinations of the sides FA and FB are indicated with $\alpha$ and $\beta$. These inclinations are in substance defined as the angle formed between the side surface (identified by the intersection between the protuberance P3 and the sectional plane) and the straight line RA or RB representing the line in the cross sectional plane of a plane orthogonal to the rotation axis of the embossing roller 3. It must be understood that the smaller the angle $\alpha$ or $\beta$, the greater the inclination (i.e. the steepness) of a side surface. Therefore, the straight line RA or RB indicates a radial direction and is the straight line lying in the sectional plane, and therefore intersecting the sides FA or FB, and passing through the rotation axis of the roller and orthogonal to said rotation axis.

FIGS. 4 to 6 also show the lines of intersection F1 and F2 between the lateral surfaces forming the sides FA and FB and the bottom F of the cavity that generated the protuberance P3. As shown in FIG. 5, in actual fact the lateral surface FA or FB and the bottom F are connected with a curved surface which, in the cross section of FIG. 5, defines a connecting line with a radius that can even be very wide. In this case the line F1 or F2 is defined by the intersection of the prolongations of the straight lines defining the bottom F and the straight line defining the side FA or FB.

FIG. 5 represents a situation in which the lateral surfaces of the linear embossing protuberance P3 define in the cross sectional plane straight lines of intersection FA, FB. This is the preferred situation, as protuberances of this shape are easier to generate. However, with the current engraving techniques it is also possible to produce protuberances of more complex shape with more elaborate cross sections, where the side surfaces have a curvilinear, concave, convex or mixed shape, partly concave and partly convex.

Figure 5A:
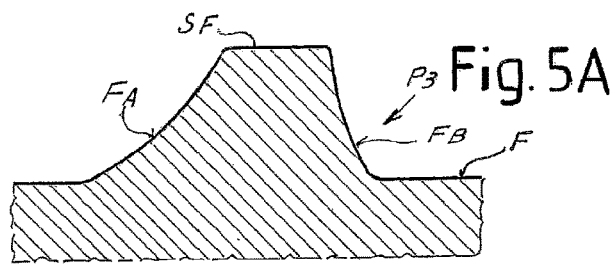
FIGS. 5A, 5B, 5C and 5D show sections analogous to those of FIG. 5 in variants of embodiment.
Figure 5B:
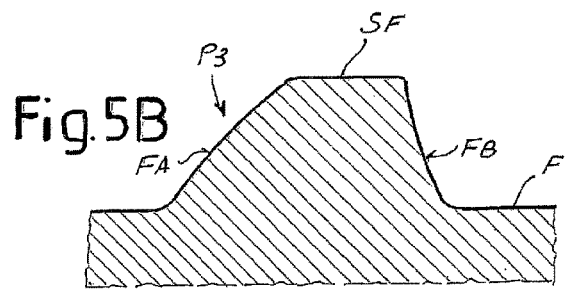
Figure 5C:
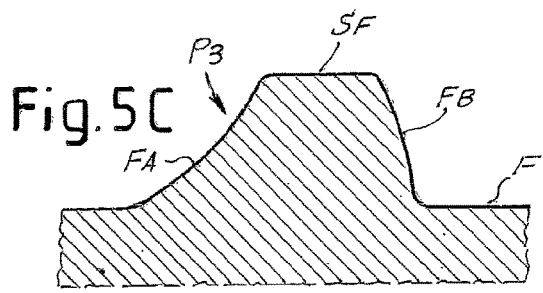
Figure 5D:
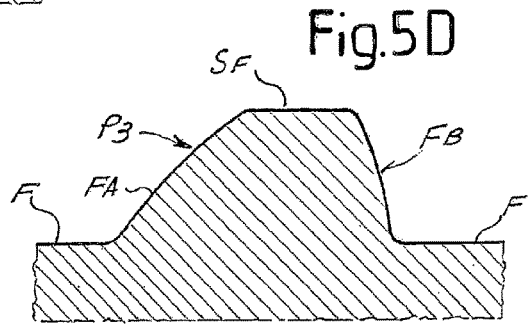

FIGS. 5A, 5B and 5C schematically show, in a cross section, three embodiments of complex protuberances of this type. In these figures the protuberance is once again indicated with P3 and SF indicates the front surface thereof. The sides of the protuberance are indicated with FA and FB. FIG. 5A shows an example in which both the sides FA and FB are curved and concave, FIG. 5B shows an example of a convex side FA and a concave side FB, and FIG. 5C shows an example with a concave side FA and a convex side FB. Finally, FIG. 5D shows an example in which both the sides FA and FB are convex.

In all the schematic examples of the FIGS. 5A to 5D the two sides FA and FB have inclinations different from each other. The inclination, in this case, is not constant along the extension of each side from the foot to the head of the protuberance P3, as the side is curvilinear. However, an average slope, i.e. an average inclination of each side, or a slope or inclination at the center point of each side, can still be identified. Using one or other of these definitions of inclination of the side it can be observed that in all the examples represented in FIGS. 5A-5D, the side FA has a lesser inclination (i.e. is less steep) than the side FB. The inclination of the two opposed sides of a protuberance can also differ in the sense that, although the average slope, or the slope in the central point, is the same, the two sides have different variations of the angle of inclination moving from the lower end to the upper end, i.e. different modes in which the angle of inclination varies according to the distance from the axis of the roller.

It must be understood, as will be more apparent below, that the inclinations of the two sides FA, FB of an embossing protuberance P3 can vary along the linear extension of the protuberance even to such an extent that an inversion of the inclination ratios is obtained, in the sense that the side which in a certain point of the protuberance is more inclined than the other, in a different point of the same linear embossing protuberance becomes less inclined, while the inclination of the opposed side increases.

As indicated in the introduction of the description, the shape of the protuberance determines a greater or lesser degree of stress, i.e. a greater or lesser mechanical stress on the structure of the cellulose fibers forming the ply V1 of the web material. In particular, the inclination of the side of the embossing protuberance P3 is linked to the degree of stress, i.e. to the mechanical stress on the structure of the fibers, as the greater the inclination of the side (and therefore the smaller the angle formed with the radial direction), the greater the stress induced in the cellulose ply. In fact, it must be understood that when the embossing protuberance P3 penetrates the elastically yielding layer 5B of the pressure roller 5, the ply of cellulose material V1 is subjected to a deformation along the sides of the protuberance P with consequent elongation of the basic structure of the ply. The greater the inclination of the side, the more concentrated the deformation through elongation. Vice versa, the less inclined the side, i.e. the larger the angle $\alpha$ or $\beta$ that the side forms with the radial direction as defined above, the more widely distributed the elongation deformation in the cellulose material, resulting in a greater distribution of the stress and therefore a lesser percentage of stress.

Figure 5E:
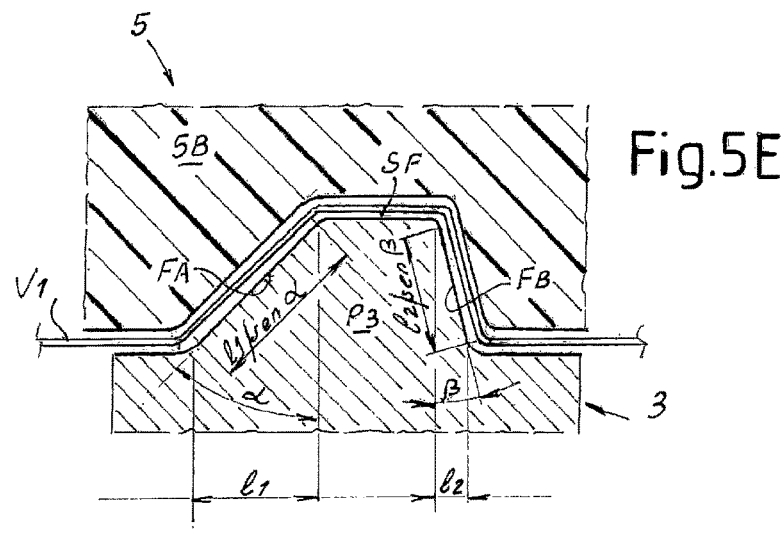
FIG. 5E shows an explanatory diagram of the trend of embossing stresses according to the inclination of the side surface of the embossing protuberance.

FIG. 5E explains this phenomenon with reference to a schematic representation of a single protuberance cooperating with the elastically yielding layer 5B of the pressure roller 5 and with reference to a portion of ply V1 that is deformed between the embossing protuberance P3 and the yielding layer 5B of the pressure roller 5. In the diagram of FIG. 5E the surfaces of the protuberance P3, of the yielding coating 5B and of the ply V1 are shown separated from one another for the sake of clarity of representation, but it must be understood that in actual fact these surfaces are pressed against one another at least on the front surface SF and on the sides FA and FB of the protuberance P3. It is understood that the length L1 of the material of the ply V1 is elongated through deformation on the side FA of the protuberance P3 up to the length $L1/\text{sen}\alpha$. Vice versa, the length L2 is elongated through deformation along the side FB until reaching the length $L2/\text{sen}\beta$. Therefore, it can be observed that along the side FA forming the larger angle $\alpha$ with respect to the radial direction, i.e. along the less inclined side, there is a substantially lesser percentage of elongation and therefore a substantially lesser tensile stress of the paper with respect to that occurring along the more inclined side FB, i.e. forming the smaller angle $\beta$ with the radial direction.

By varying the angle of one, of the other or of both the sides of each embossing protuberance P3 it is thus possible to modify, in each point of the linear extension of each protuberance P3, the embossing stress to which the cellulose ply V1 is subjected.

As observed above, the strength of the cellulose ply is not equal in the directions MD and CD. As a result of the technology used to form the cellulose ply, the tensile strength is greater in the direction MD and lesser in the direction CD.

According to one aspect, the invention suggests modulation of the mechanical stress, i.e. the embossing stress applied to the ply V1, by modifying a geometric parameter of the cross section of the embossing protuberance, for example according to the inclination that the protuberance has with respect to the machine direction MD or with respect to the cross direction CD.

More in particular, according to one aspect, in order to orient the linear embossing protuberances P3 with any angle with respect to the directions MD and CD, advantageously when the angle of inclination $\gamma$ (FIG. 6) between the embossing protuberance and the machine direction MD decreases, the cross section of the embossing protuberance is modified to reduce the stress, i.e. the embossing stress applied to the cellulose material. This is obtained advantageously by modifying the angle of inclination $\alpha$, $\beta$ of the side of the protuberance. The smaller the angle $\gamma$ of the embossing protuberance P3 with respect to the machine direction MD, the lesser the embossing stress that must be applied, as this stress causes an elongation of the paper in cross direction CD, i.e. in the direction in which the cellulose ply has the least strength.

Therefore, according to a mode of implementation of the invention, the side of the embossing protuberance P3 will undergo a variation forming an angle $\alpha$, or an angle $\beta$ that is larger the smaller the angle $\gamma$ of inclination of the protuberance with respect to the machine direction MD. In other words, by making a series of cross sections along a generic embossing protuberance P3, when the inclination angle γ of the protuberance decreases with respect to the direction MD at the cross section, in this section there will be a gradual increase of the angle α and/or of the angle β formed by the side of the protuberance P3 with respect to the radial direction.

Moreover, it must be understood that when the embossing protuberances have a particularly marked curvature, with an extrados and an intrados, i.e. a convexity and a concavity, the cellulose structure of the ply will be stressed to a greater degree on the extrados with respect to the intrados. According to some advantageous embodiments it is therefore advantageous for the two angles α and β to differ from each other, with a larger angle α (less steep side) on the extrados and an smaller angle β (steeper side) on the intrados of the curve formed by the protuberance.

This can be explained better with reference to FIGS. 7 and 7A-7F which refer to a possible embodiment of the pattern of the embossing protuberances.

Figure 7:
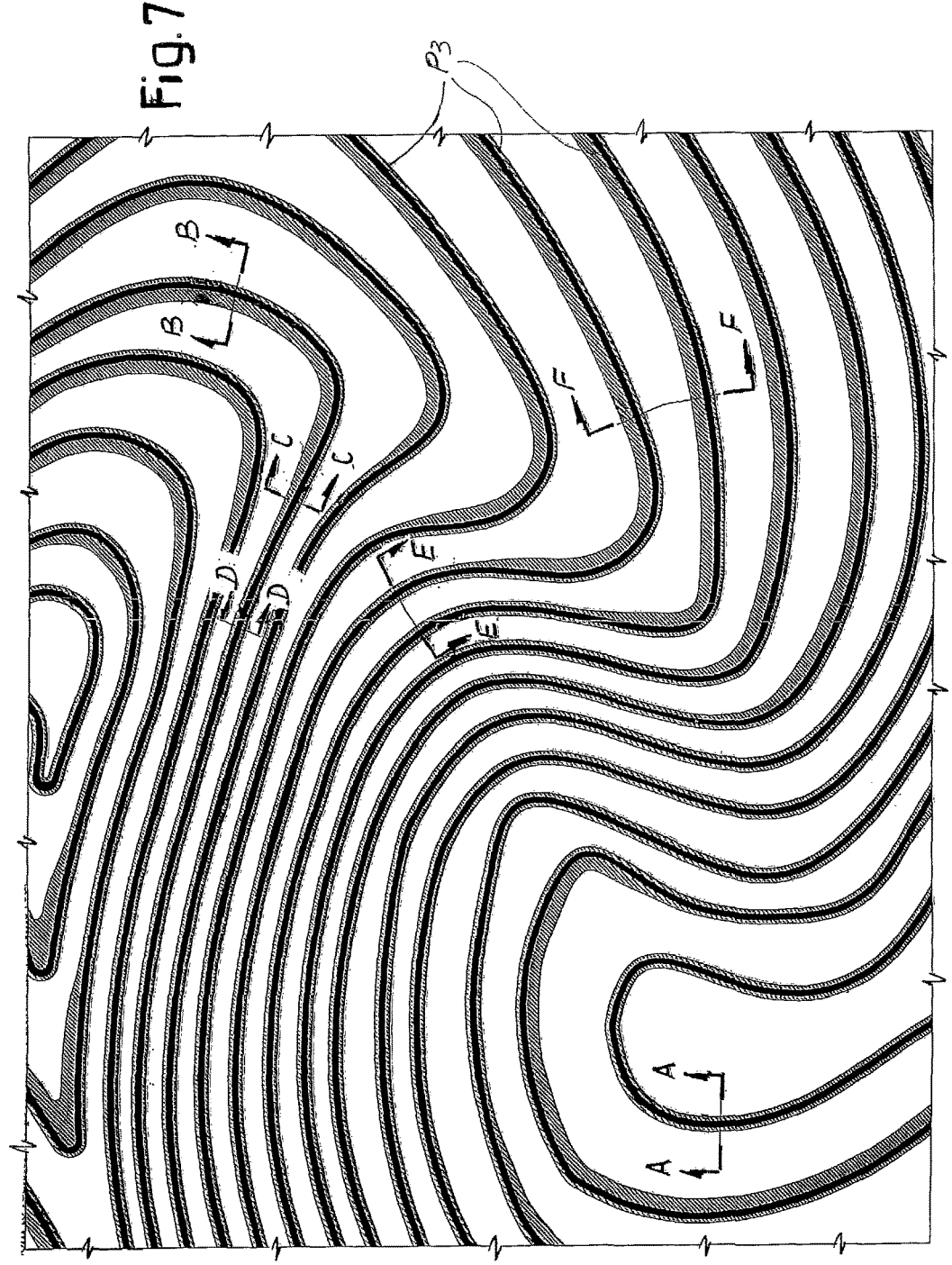
FIG. 7 shows a flattened view of a portion of cylindrical surface of an embossing roller according to the invention in a possible embodiment.

FIG. 7 shows a flattened view of a portion of the embossing roller 3 with linear embossing protuberances P3. Similarly, FIG. 7 can be understood as a representation of the embossing protrusions obtained on the ply V1 with an embossing roller thus configured. In FIG. 7 the front surface of the linear protuberances is indicated with a black line. At the sides of the black lines are hatched areas which represent the lateral surfaces or sides of the protuberances of the roller. In the corresponding embossing pattern obtained on the web material the black and hatched lines correspond to the front and lateral surfaces of the embossing protrusions.

The sectional lines indicated with the letters from A-A to F-F indicate the lines of the cross sectional planes in various points of the extension of the embossing pattern. FIGS. 7A to 7F show the cross sections, the letter following the number of the figure corresponding to the letter indicating the sectional plane in FIG. 7.

The sectional plane A-A shows the shape of the cross section of a linear embossing protuberance P3 which has the two sides with the same inclination with respect to the radial direction and more precisely with an inclination of 17° for each side. In the sectional plane B-B the protuberance has a side FB with the same inclination (17°) as the side FB in the section of FIG. 7A. Vice versa, the side FA has a lesser inclination with respect to the vertical, i.e. forms an angle α of 45° with respect to the radial direction. Therefore, in the sectional plane B-B the protuberance has a smaller stress-related characteristic than that of the embossing protuberance in the cross section with the line A-A. This is the case at least for one of the two sides of the protuberance.

FIG. 7C shows an intermediate situation in which the angle α formed by the side FA with respect to the radial direction is equal to 26°, greater with respect to the inclination, of 17° defined by the angle β formed by the side FB with the radial direction.

FIG. 7D shows the sectional plane along line D-D where the shape of the cross section is the same as that of FIG. 7A.

FIG. 7E shows the section of two adjacent linear embossing protuberances P3, equal to each other and with sides FA and FB having the same inclination, equal to 17° for each side.

Vice versa, the section along line F-F of FIG. 7F shows a situation in which the same embossing protuberances P3 as FIG. 7E have undergone a variation of the cross section with consequent variation of the stress-related characteristic represented by the inclination of the left side. This latter from an angle α equal to 17° (FIG. 7E) has changed to an angle α of 45° (FIG. 7F) for both the adjacent protuberances P3. The side FB instead forms an angle β equal to 17°, i.e. with no variation with respect to the corresponding side surface FB in FIG. 7E. By analyzing the sequence of the sections 7B-7C-7D it is clear how the variation of the angle of one side (in this case the side FA) is progressive.

The inclination of one, of the other or of both the sides of the linear embossing protuberance is not the only stress-related parameter, i.e. linked to the stress of the cellulose material, on which it is possible to act in order to modulate the stress applied to the cellulose ply. In fact, the other parameters remaining constant, the deformation impressed on the cellulose ply can also vary by modifying along the linear extension of the embossing protuberance, the height of said protuberance, i.e. the distance of the front surface SF of the protuberance from the rotation axis of the roller. Vice versa, in other embodiments it is possible to vary the engraving depth, i.e. the position of the bottom of the cavity between adjacent protuberances.

FIG. 8 and the cross sections of FIGS. 8A to 8H show alternative embodiments of this type. As indicated in the various sections, the angle formed by each side surface of the embossing protuberances P3 in the various sections is always the same for both the sides and for all the sections. In the example illustrated this angle is equal to 17° so that the angle between the two sides is equal to 2α=34°. It must be understood that this value is provided purely as an example and is not limiting. Between one section and the other in the various points of the area or portion of the embossing roller illustrated in FIG. 8 the height of the protuberance varies.

FIG. 8 indicates the machine direction MD and the cross direction CD. It can be observed that the cross-section with the line C-C, B-B and A-A of the same embossing protuberance P3 are made in points thereof with gradually decreasing inclination with respect to the machine direction MD. The cross-section along line A-A is made in substance at a point in which the embossing protuberance is substantially parallel to the machine direction MD. In this section the embossing stress must be reduced through reduction of the height of the protuberance so that the cellulose material does not break or in any case there is no initial detachment of the fibers with consequent splitting of the web material, as in this area the tensile stress on the cellulose material is exerted in a direction corresponding to the direction CD, i.e. parallel to the direction of least strength of the cellulose structure. The section along line C-C is made in a point of the embossing protuberance in which the latter is almost parallel to the cross direction CD. The stress exerted on the cellulose material is therefore substantially parallel to the machine direction MD, i.e. to the direction of maximum strength of the cellulose ply. The height of the protuberance P3 can be equal to the maximum value h3. The section along line B-B is made in a position with intermediate inclination and therefore the height h2 of the protuberance has been selected between the two maximum h3 and minimum h1 values to modulate in a manner corresponding to an average value the mechanical stress exerted on the cellulose structure of the ply V1.

The sections of FIGS. 8A, 8B and 8C show the gradual variation of the height of the protuberance from the value h1 (1 mm in the example) in the section A-A (FIG. 8A) to the value h3 (1.4 mm in the example) in the section C-C of FIG. 8C. This gradual variation of the height of the protuberance can be obtained by modifying the distance of the front surface SF of the embossing protuberance from the rotation axis of the roller or by deeper engraving, i.e. elongation of the side surfaces toward the axis of the roller, maintaining the front surface SF of the protuberance always on a cylindrical surface with a constant radius. In this second case during production of the roller it is possible to grind the outer surface of the various protuberances, consequently improving processing. Moreover, it is possible to distribute glue on all the radially outermost surfaces of the ply V1 embossed in the embossing nip G1 (FIG. 1). This is because the glue is applied only at a cylindrical surface with constant radius and equal to the maximum radial dimension of the protuberances of the embossing roller 3.

Vice versa, by producing one or more embossing protuberances P3 with a front surface SF having a variable distance from the rotation axis of the roller, modulation of the embossing stress is improved, although is obtained at the expense of it being impossible to grind the whole front surface SF of all the protuberances, as only the radially outermost portions of front surface SF will be ground. Moreover, the glue will be applied to the ply V1 only at the radially outermost portions of front surface SF along the various embossing protuberances.

The two sections of FIGS. 8D and 8E show pairs of protuberances in which the total height of the protuberances changes, passing from the value h1 in FIG. 8D to the value h2 in FIG. 8E.

The sections along lines D-D, E-E and F-F shown in FIGS. 8D, 8E and 8F are also made at points in which the protuberances have a different inclination with respect to the machine direction MD and to the cross direction CD. More in particular, for the section along line F-F the inclination of the protuberance P3 with respect to the machine direction MD is maximum and therefore also the height h3 of the protuberances is maximum. The section along line E-E was made in an area in which the inclination of the protuberances with respect to the machine direction MD is less than the inclination assumed by these protuberances in the section F-F, but still greater than the inclination at the section along line D-D. Consequently, the height h2 of the protuberances in the section E-E of FIG. 8E is intermediate between the height h3 of the section F-F (FIG. 8F) and the height h1 in the section along line D-D (FIG. 8D).

FIGS. 8G and 8H show the same cross section at line G-G in two different embodiments. In FIG. 8G the height of the protuberance in the two points of the section varies from the value h3 (1.4 mm) to the value h1 (1 mm) as a result of reduction of the distance between the front surface or head of the embossing protuberance and the axis of the roller. The letter H indicates the height difference in the embossing protuberance P3 in the two points of the section. In FIG. 8H the two sections are shown adjacent along the line G-G where, however, the variation of height from h3 to h1 (in the example from 1.4 to 1 mm) is obtained without varying the radial distance of the front surface or head of the protuberance from the rotation axis of the roller and varying, vice versa, the engraving depth of the roller, as can be observed from the shape of the bottom F of the cavity produced in the surface surrounded by the protuberance P3.

Both the height of the protuberance, variable by adjusting the position of the front surface or of the foot, and the inclination of one, of the other, or of both the sides of the protuberance, constitute stress-related variables or parameters in the sense of the present invention. One or other or more than one of these parameters in combination can be modified along the linear extension of one or more embossing protuberances P3 in particular to modulate the embossing stress applied to the cellulose structure of the ply V1 according to the inclination γ with respect to the machine direction MD or according to the inclination δ with respect to the cross direction CD. As described above, and for the reasons indicated above, the variation of the stress-related parameter or parameters is in direct relation with respect to the angle δ formed by the protuberance with respect to the cross direction CD, or in a manner inverse to the angle γ formed with respect to the machine direction: the closer the embossing protuberance to an orientation parallel to the machine direction MD, the lesser the stress that must be applied to the cellulose material.

These concepts and some of the possible variations of the geometric parameters or of stress-related shape are summed up schematically in FIGS. 9 and 10. More in particular, in FIG. 9, A, B, C and D schematically represent the same portion of a generic embossing protuberance P3 in different embodiments, each of which is cross sectioned in two points with planes along lines x-x and y-y. The figure also indicates the machine direction MD and the cross direction CD.

In each of the four embodiments, the portion of embossing protuberance P3 is represented with a continuous line indicating the edges of the front surface SF and with broken lines indicating the profiles of the foot, i.e. of the lines of intersection between the lateral surfaces of the protuberance and the bottom of the cavity.

FIG. 10 represents the cross sections in the planes with the lines x-x and y-y respectively, for the different embodiments. More in particular, the sections indicated with (A) in FIG. 10 refer to the protuberance of FIG. 9A, the sections indicated with ($B_1$) and ($B_2$) refer to two embodiments of the protuberance of FIG. 9B, the sections indicated with ($C_1$) and ($C_2$) refer to the embodiment of the protuberance of FIG. 9C, and the sections indicated with (D) refer to the embodiment of the protuberance of FIG. 9D.

In short the portion of embossing protuberance shown in FIG. 9A has a variable inclination from the sectional plane x-x to the sectional plane y-y passing from a very steep inclination with respect to the machine direction to an orientation almost parallel to the machine direction MD. As a result of this, as can be seen by comparing the two sections indicated in FIG. 10(A), there is a reduction of the stress applied to the cellulose material due to the increase of the angle α1 formed by the left side of the protuberance passing from the section x-x to the section y-y. In the example shown, the two side surfaces have different inclinations on the two sides of the protuberance and both the side surfaces have a variable inclination that increases from the section x-x to the section y-y. The angles α1 and β1 of inclination of the side surfaces in the section x-x increase to pass to the value α2 and β2 in the section y-y;

in the embodiment of FIG. 9B the inclination of the sides remains constant and is, in this example, different for the two sides of the protuberance as can be observed from the sections ($B_1$) and ($B_2$) in FIG. 10. The parameter that varies passing from the section with the line x-x to the section with the line y-y in the case of the section ($B_1$) is the distance of the front surface SF of the protuberance from the rotation axis of the roller, H being the difference in height moving from one to the other of the two sections. Vice versa, the section ($B_2$) shows the solution in which the reduction of stress is obtained by reducing the engraving depth passing from the section x-x to the section with the line y-y. H1 indicates the difference in the engraving depth. In both the sections ($B_1$) and ($B_2$) the right and left side surfaces of the protuberance, although remaining constant passing from one section to the other, are different for the right side and for the left side;

in the embodiment of FIG. 9C the two side surfaces have the same inclination on the two sides of the protuberance. The variation of the stress of the cellulose material can be obtained by varying the radial distance of the front surface of the protuberance passing from one section to the other and more precisely reducing the height of the protuberance passing from the section x-x to the section y-y, as shown in the section (C$_1$) of FIG. 10, or reducing the engraving depth, as shown in the section (C$_2$);

in FIG. 9D the protuberance has side surfaces that vary in inclination symmetrically on the two sides passing from the section x-x to the section y-y, as better shown in the cross sections (D) of FIG. 10, where it can be seen how the angle of inclination α between the side and the radial direction increases from α to α1 passing from the section x-x to the section y-y, with consequent lesser stress of the cellulose material.

Figure 11:
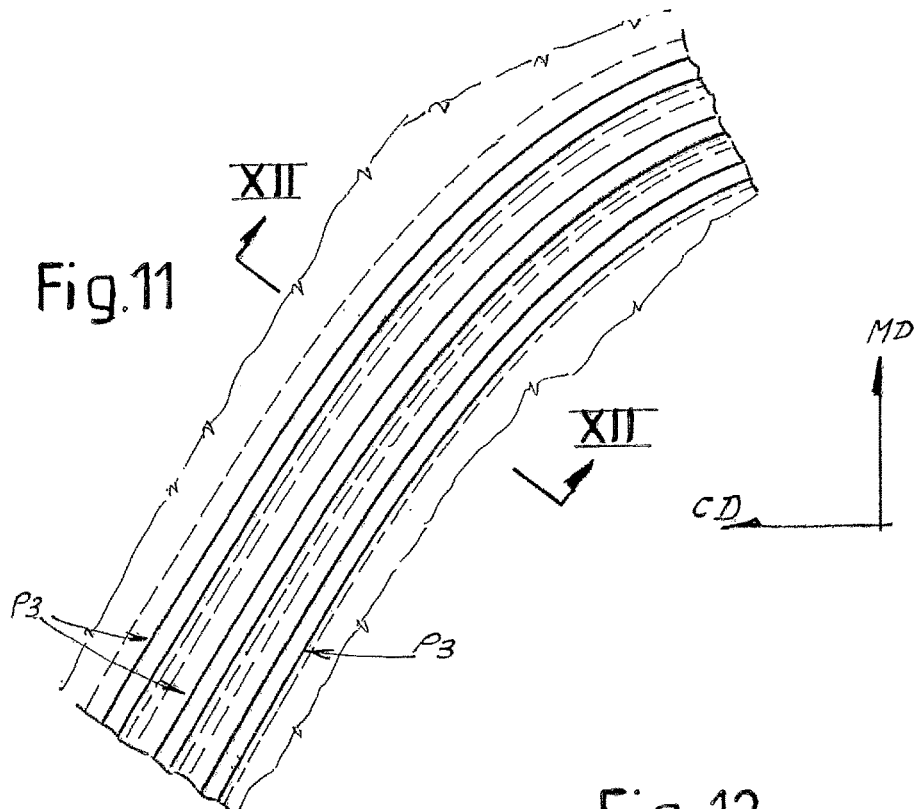
FIG. 11 shows a schematic representation of a further portion of cylindrical surface of an embossing roller according to the invention.
Figure 12:
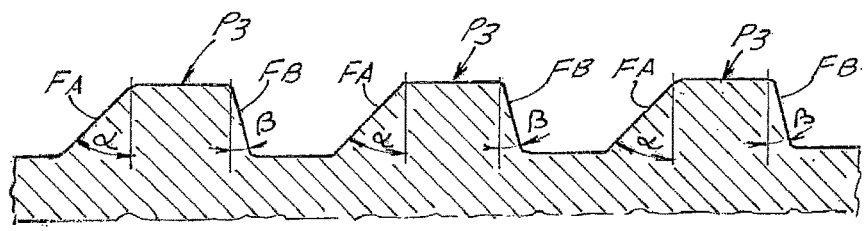
FIG. 12 shows a cross section according to the line XII-XII of FIG. 11.

According to another aspect of the invention, the embossing roller 3 can be provided with linear embossing protuberances, preferably (but not necessarily) continuous, optionally with a variable inclination with respect to the machine direction and/or to the cross direction, or also with constant inclination, wherein the two opposed sides of the protuberances have different inclinations to each other and wherein adjacent protuberances have the side surfaces facing one side with a first inclination and side surfaces facing the opposite side with a second inclination, different from the first. FIGS. 11 and 12 show a portion of an embossing roller 3 on which there are provided three linear embossing protuberances P3 adjacent to one another and approximately parallel with a trend that in this embodiment has an inclination with respect to the machine direction MD and with respect to the cross direction CD slightly variable along the extension of said protuberances. FIG. 12 shows a local section according to XII-XII of FIG. 11. In the cross section of FIG. 12 three protuberances are visible, each of which has a first side FA (on the left in the drawing) and a second side FB (on the right in the drawing).

Figure 12A:
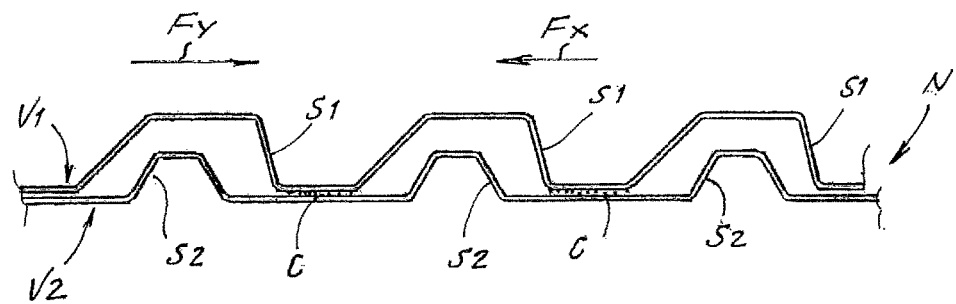
FIG. 12A shows a schematic cross section of a multiple ply web material obtainable with a roller engraved according to FIGS. 11 and 12.

Advantageously, the side surfaces FA facing the same side all have a greater inclination than the same side surfaces FB of the opposite side. Preferably, all the side surfaces FA have an equal inclination α for all the protuberances and all the side surfaces FB also have an equal inclination β, with α>β. These inclinations can vary, preferably in a concordant manner for various adjacent protuberances, along the extension of the same protuberances. In this way the web material obtained, and which is shown in a schematic section in FIG. 12A has in cross section embossing protrusions S1 on the ply V1 that have side surfaces with different inclinations to one another, i.e. not symmetrical with respect to a plane orthogonal to the front surface of the protrusion and tangent to the centerline of the protrusion in the point of the cross section. This ensures that the web material N offers a different feeling to the touch depending on whether it is touched with the hand moving toward the steeper side surface or toward the less steep side surface of the protrusions S1 facing the inside of the web material N.

The material N thus has different tactile characteristics according to the direction in which the same material is passed over a surface.

This characteristic can have various applications, for example in the production of cellulose materials for personal hygiene or for domestic use. A greater abrasive efficacy is obtained by passing the web material N over a surface with a relative movement according to the arrow Fy (FIG. 12A) and a softer and less abrasive effect is obtained with a relative movement between the web material N and the surface according to Fx.

This particular configuration can also be implemented by producing protuberances P3 with a constant inclination with respect to the machine direction MD and/or to the cross direction CD, or a less marked variation and such that in any case it is not necessary to introduce a modulation of the stress-related characteristic of the embossing protuberances, for example by avoiding to reach angles of inclination γ with respect to the machine direction so small that it becomes necessary to reduce the embossing stress to prevent the risk of breakage of the cellulose material.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. An embossing roller with a rotation axis and a substantially cylindrical surface; wherein a plurality of curvilinear embossing protuberances with linear longitudinal extension are provided on said cylindrical surface; wherein each curvilinear embossing protuberance of said plurality of curvilinear embossing protuberances has a front surface having a distance from an axis of rotation of the embossing roller, a first side extending from the front surface forming a first angle of inclination (α) with a radial direction orthogonal to the rotation axis of the embossing roller, a second side extending from the front surface forming a second angle of inclination (β) with said radial direction, said first side and said second side have respective radial extensions towards the rotation axis of the embossing roller; wherein along the linear longitudinal extension of said each curvilinear embossing protuberance is an inclination to an axial direction parallel to the rotation axis of the embossing roller, and wherein said inclination of said each curvilinear embossing protuberance varies along a longitudinal curvilinear extension of said each curvilinear embossing protuberance; wherein said each curvilinear embossing protuberance has at least one stress-related characteristic which varies along the longitudinal curvilinear extension of said each curvilinear embossing protuberance; and wherein said at least one stress-related characteristic varies according to said inclination of said each embossing protuberance with respect to the rotation axis of the embossing roller, and said at least one stress-related characteristic comprises at least one of the cross section of the protuberance; said first angle of inclination (α) of the first side of the protuberance; said second angle of inclination (β) of the second side of the protuberance; said distance of the front surface of the protuberance from the rotation axis of the embossing roller; the radial extension towards the rotation axis of the embossing roller of the first side or of the second side of the protuberance.

2. The embossing roller as claimed in claim 1, wherein said embossing protuberances have a cross section of variable shape along the linear longitudinal extension thereof.

3. The embossing roller as claimed in claim 2, wherein said cross section varies according to the inclination of the protuberance with respect to the rotation axis of the embossing roller.

4. The embossing roller as claimed in claim 2, wherein along the linear longitudinal extension of said embossing protuberances the cross section has at least one variable geometric parameter.

5. The embossing roller as claimed in claim 1, wherein in at least some cross sections of at least some of the embossing protuberances have sides of non-symmetrical shapes with respect to a centerline of the cross section.

6. The embossing roller as claimed in claim 1, wherein said embossing protuberances are continuous.

7. The embossing roller as claimed in claim 1, wherein at least one of said first side and said second side has a concave configuration.

8. The embossing roller as claimed in claim 7, wherein at least one of said first side and said second side have a connecting portion with the front surface of the protuberance and a connecting portion with a base of the protuberance, and wherein between said connecting portion with the first surface and the connecting portion with the base, said at least one of said first side and said second side has at least one concave intermediate portion.

9. The embossing roller as claimed in claim 1, wherein in at least some portions of said embossing protuberances said first side and said second side form, with a radial direction, different angles.

10. The embossing roller as claimed in claim 9, further comprising a plurality of adjacent linear embossing protuberances with a first side surface and a second side surface, and wherein in at least one portion of longitudinal extension of said adjacent embossing protuberances, the first side surface has a greater inclination than the second side surface on an opposite side thereto.

11. The embossing roller as claimed in claim 1, further comprising a plurality of adjacent linear embossing protuberances having in at least one part of an extension thereof being concordantly oriented curvatures, adjacent linear embossing protuberances being surrounded by one another.

12. The embossing roller as claimed in claim 1, wherein in at least some portions of the cylindrical surface of the embossing roller said embossing protuberances are arranged mutually adjacent with a reciprocal distance variable along the linear extension of the embossing protuberances.

13. The embossing roller as claimed in claim 1, wherein at least some of said embossing protuberances have a curvilinear shape with an extrados and an intrados, and wherein said stress-related characteristic is different on the extrados with respect to the intrados of the embossing protuberance.

14. The embossing roller as claimed in claim 13, wherein at least one of said first side and said second side of said embossing protuberances is more inclined on the intrados and less inclined on the extrados in relation to each other.

15. An embossing roller with a rotation axis and a substantially cylindrical surface; wherein a plurality of curvilinear embossing protuberances with linear longitudinal extension are provided on said cylindrical surface; wherein each curvilinear embossing protuberance of said plurality of curvilinear embossing protuberances has a front surface having a distance from an axis of rotation of the embossing roller, a first side extending from the front surface forming a first angle of inclination ($\alpha$) with a radial direction orthogonal to the rotation axis of the embossing roller, a second side extending from the front surface forming a second angle of inclination ($\beta$) with said radial direction, said first side and said second side have respective radial extensions towards the rotation axis of the embossing roller; wherein along the linear longitudinal extension of said each curvilinear embossing protuberance is an inclination to an axial direction parallel to the rotation axis of the embossing roller, and wherein said inclination of said each curvilinear embossing protuberance varies along a longitudinal curvilinear extension of said each curvilinear embossing protuberance; and wherein said each curvilinear embossing protuberance has at least one stress-related characteristic which varies along the longitudinal curvilinear extension of said each curvilinear embossing protuberance in accordance with said inclination of the embossing protuberance; and wherein said at least one stress-related characteristic varies according to said inclination of said each embossing protuberance with respect to the rotation axis of the embossing roller, and said at least one stress-related characteristic comprises at least one of the cross section of the protuberance; said first angle of inclination ($\alpha$) of the first side of the protuberance; said second angle of inclination ($\beta$) of the second side of the protuberance; said distance of the front surface of the protuberance from the rotation axis of the embossing roller; the radial extension towards the rotation axis of the embossing roller of the first side or of the second side of the protuberance.

16. An embossing roller with a rotation axis and a substantially cylindrical surface; wherein a plurality of curvilinear embossing protuberances with linear longitudinal extension are provided on said cylindrical surface; wherein each curvilinear embossing protuberance of said plurality of curvilinear embossing protuberances has a front surface having a distance from an axis of rotation of the embossing roller, a first side extending from the front surface forming a first angle of inclination ($\alpha$) with a radial direction orthogonal to the rotation axis of the embossing roller, a second side extending from the front surface forming a second angle of inclination ($\beta$) with said radial direction, said first side and said second side have respective radial extensions towards the rotation axis of the embossing roller; wherein along the linear longitudinal extension of said each curvilinear embossing protuberance is an inclination to an axial direction parallel to the rotation axis of the embossing roller, and wherein said inclination of said each curvilinear embossing protuberance varies along a longitudinal curvilinear extension of said each curvilinear embossing protuberance; wherein said each curvilinear embossing protuberance has at least one stress-related characteristic which varies along the longitudinal curvilinear extension of said each curvilinear embossing protuberance in accordance with said inclination of the embossing protuberance, such that said embossing protuberance is configured to impart a lesser degree of embossing where the inclination is larger and a higher degree of embossing where the inclination is smaller; and wherein said at least one stress-related characteristic varies according to said inclination of said each embossing protuberance with respect to the rotation axis of the embossing roller, and said at least one stress-related characteristic comprises at least one of the cross section of the protuberance; said first angle of inclination ($\alpha$) of the first side of the protuberance; said second angle of inclination ($\beta$) of the second side of the protuberance; said distance of the front surface of the protuberance from the rotation axis of the embossing roller; the radial extension towards the rotation axis of the embossing roller of the first side or of the second side of the protuberance.

* * * * *